US009678586B2

(12) United States Patent
Reynolds

(10) Patent No.: US 9,678,586 B2
(45) Date of Patent: Jun. 13, 2017

(54) TOUCH AND DISPLAY DEVICE HAVING AN INTEGRATED SENSOR CONTROLLER

(75) Inventor: Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 897 days.

(21) Appl. No.: 13/436,207

(22) Filed: Mar. 30, 2012

(65) Prior Publication Data

US 2012/0319966 A1    Dec. 20, 2012

Related U.S. Application Data

(60) Provisional application No. 61/498,937, filed on Jun. 20, 2011.

(51) Int. Cl.
*G06F 3/0488* (2013.01)
*G06F 3/041* (2006.01)
*G06F 3/044* (2006.01)

(52) U.S. Cl.
CPC .............. *G06F 3/041* (2013.01); *G06F 3/044* (2013.01); *G06F 3/0416* (2013.01); *G06F 2203/04103* (2013.01); *Y10T 29/49002* (2015.01)

(58) Field of Classification Search
USPC ........................................... 361/679; 345/173
See application file for complete search history.

(56) References Cited

U.S. PATENT DOCUMENTS

| | | | |
|---|---|---|---|
| 5,841,078 A | 11/1998 | Miller et al. | |
| 6,771,327 B2 | 8/2004 | Sekiguchi | |
| 7,218,314 B2 | 5/2007 | Itoh | |
| 7,388,571 B2 | 6/2008 | Lowles et al. | |
| 2004/0222974 A1 | 11/2004 | Hong et al. | |
| 2007/0030254 A1* | 2/2007 | Robrecht et al. ............. | 345/173 |
| 2007/0222762 A1 | 9/2007 | Van Delden et al. | |
| 2008/0062140 A1 | 3/2008 | Hotelling et al. | |
| 2008/0117182 A1 | 5/2008 | Um et al. | |
| 2009/0046077 A1 | 2/2009 | Tanaka et al. | |
| 2009/0107737 A1 | 4/2009 | Reynolds et al. | |
| 2009/0185100 A1 | 7/2009 | Matsuhira et al. | |
| 2009/0201267 A1 | 8/2009 | Akimoto et al. | |
| 2009/0213534 A1* | 8/2009 | Sakai ....................... | 361/679.21 |
| 2009/0315844 A1* | 12/2009 | Saito et al. ................... | 345/173 |
| 2010/0085326 A1* | 4/2010 | Anno ............................ | 345/174 |
| 2010/0289770 A1 | 11/2010 | Lee et al. | |
| 2011/0050585 A1* | 3/2011 | Hotelling et al. ............ | 345/173 |
| 2011/0080357 A1 | 4/2011 | Park et al. | |

(Continued)

FOREIGN PATENT DOCUMENTS

CN   101228498 A   7/2008
WO   WO-2010136932 A1   12/2010

(Continued)

OTHER PUBLICATIONS

ASIC Packaging Guidebook, Toshiba Corporation. (2000). 35 Pages.

(Continued)

*Primary Examiner* — Kent Chang
*Assistant Examiner* — Sujit Shah
(74) *Attorney, Agent, or Firm* — Patterson + Sheridan, LLP

(57) ABSTRACT

Embodiments of the invention generally provide an input device having a smaller overall physical size and a lower production cost, and is minimally affected by electrical interference versus conventional input devices. Embodiments discussed herein include an input device that has a sensor controller disposed in close proximity to a plurality of sensing elements that are used to sense and acquire positional information of an input object. In one embodiment, the sensor controller and at least portions of the sensor electrodes are disposed between two transparent substrates that are positioned near a display device. In some embodiments, the sensor controller is disposed in an edge region of a substrate which has a sensing region through which the adjacently positioned sensor electrodes are configured to sense the presence of an input object.

28 Claims, 10 Drawing Sheets

(56) References Cited

U.S. PATENT DOCUMENTS

2011/0090159 A1* 4/2011 Kurashima ................. 345/173
2011/0109579 A1  5/2011 Wang et al.
2012/0293445 A1* 11/2012 Crandall et al. ............. 345/174

FOREIGN PATENT DOCUMENTS

WO   WO-2010117946 A3   1/2011
WO   WO-2011028451 A1   3/2011

OTHER PUBLICATIONS

Fujitsu Microelectronics Limited. "IC Package." (2002). 10 Pages.
PCT international search report and written opinion of PCT/US2012/031668 dated Oct. 30, 2012.
State Intellectual Property Office of People's Republic of China Search Report, Application No. 21280040550.5, dated Oct. 12, 2015, consists of 2 pages.
Chinese Office Action, Application No. 201280040550.5 dated Nov. 4, 2015. English translation consists of 16 pages.
Chinese Office Action, Application No. 201280040550.5 dated Jun. 20, 2016. English translation consists of 15 pages.
Chinese Office Action, Received Feb. 21, 2017, Application No. 201280040550.5 dated Dec. 28, 2016. English translation consists of 17 pages.

* cited by examiner

TOUCH AND DISPLAY DEVICE HAVING AN INTEGRATED SENSOR CONTROLLER

CROSS-REFERENCE TO RELATED APPLICATIONS

This application claims benefit of U.S. provisional patent application Ser. No. 61/498,937, filed Jun. 20, 2011, which is herein incorporated by reference.

BACKGROUND OF THE INVENTION

Field of the Invention

Embodiments of the present invention generally relate to a system and method for sensing an input object's position over a sensing region of a proximity sensing device.

Description of the Related Art

Input devices including proximity sensor devices, also commonly called touchpads or touch sensor devices, are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems, such as opaque touchpads integrated in, or peripheral to, notebook or desktop computers. Proximity sensor devices are also often used in smaller computing systems, such as touch screens integrated in cellular phones.

Proximity sensor devices are typically used in combination with other supporting components, such as display or input devices found in the electronic or computing system. In some configurations, the proximity sensor devices are coupled to these supporting components to provide a desired combined function or to provide a desirable complete device package. Many commercially available proximity sensor devices utilize one or more electrical techniques to determine the presence, location and/or motion of an input object, such as a capacitive or a resistive sensing technique. Typically, the proximity sensor devices utilize an array of sensor electrodes to detect the presence, location and/or motion of an input object. Due to the often large number of sensor electrodes used to sense the presence and position of an input object with desirable accuracy, and also the need to connect each of these sensor electrodes to the various signal generation and data collection components in the electronic or computing system, the cost associated with forming these interconnections, the reliability of the system and the overall size of the of the proximity sensor device are often undesirably large. It is a common goal in the consumer and industrial electronics industries to reduce the cost and/or size of the electrical components in the formed electronic device. One will note that the cost and size limitations placed on the proximity sensor device are often created by the number of traces that are required, the number of required connection points, the connection component's complexity (e.g., number of pins on a connector) and the complexity of the flexible components used to interconnect the sensor electrodes to the control system.

Moreover, the greater the length of the traces used to interconnect the sensor electrodes to the computer system, the more susceptible the proximity sensor device is to interference, such as electromagnetic interference (EMI), commonly generated by the other supporting components. The interference provided by these supporting components will adversely affect the reliability and accuracy of the data collected by the proximity sensing device. Current commercial electronic or computing systems have commonly resorted to finding ways to minimize the magnitude of the interference by distancing the EMI generating components from the proximity sensing device, adding shielding components to the device package, and/or altering the display processing method, thus making the system more expensive and/or needlessly increasing the size of the complete system package.

Therefore, there is a need for an apparatus and method of forming a proximity sensing device that is inexpensive, reliable and can be integrated within a desirably sized electronic system.

SUMMARY OF THE INVENTION

Embodiments of the invention generally provide an input device having a smaller overall physical size, a lower production cost and improve the input device's accuracy and reliability by minimizing the number of connection points, number of connectors, length of the connection traces and complexity of the circuit elements by positioning a sensor controller IC within the structure used to form the input device. One or more of the embodiments discussed herein include the mounting of a sensor controller in close proximity to a plurality of sensor electrodes that are used to sense and acquire positional information of an input object disposed over the sensing region of the input device.

Embodiments of the invention may provide an input device, comprising a first transparent substrate having a front surface and a rear surface, wherein the rear surface is on a side of the first transparent substrate opposite to the front surface, a second transparent substrate having a first surface, a plurality of sensor electrodes, and a sensor controller communicatively coupled to the plurality of sensor electrodes, wherein at least a portion of the sensor controller and a portion of the plurality of sensor electrodes are disposed in a volume defined by a region of overlap between the rear surface of the first transparent substrate and the first surface of the second transparent substrate.

Embodiments of the invention may further provide a touch screen, comprising a first transparent substrate having a front surface and a rear surface, wherein the rear surface is on a side of the first transparent substrate opposite to the front surface, a second transparent substrate having a first surface and a second surface, wherein the second surface is on a side of the second transparent substrate opposite to the first surface, a third substrate having a first surface over which at least a portion of a display device is disposed, wherein the second transparent substrate is disposed between the rear surface of the first transparent substrate and the first surface of the third substrate, a plurality of sensor electrodes, and a sensor controller communicatively coupled to the plurality of sensor electrodes. At least a portion of the sensor controller and at least a portion of the plurality of sensor electrodes can be disposed in a volume defined between the rear surface of the first transparent substrate and the first surface of the second transparent substrate.

Embodiments of the invention may further provide a method of forming an input device. The method may comprise coupling a first surface of a first transparent substrate to a first surface of a second substrate, wherein a plurality of sensor electrodes are disposed between the first surface of the first transparent substrate and the first surface of the second substrate, and coupling a sensor controller that is electrically coupled to the plurality of sensor electrodes to either the first surface of the first transparent substrate or the first surface of the second substrate so that the sensor controller is disposed in a volume defined between the first surface of the first transparent substrate and the first surface of the second substrate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
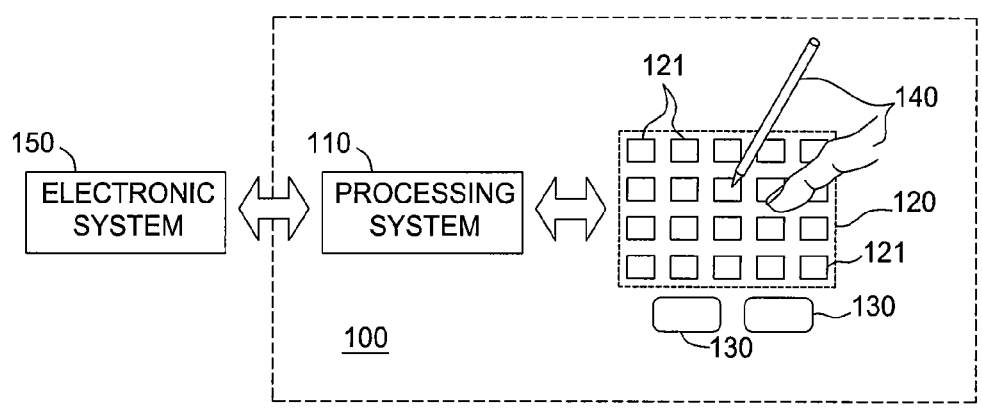
FIG. 1 is a schematic block diagram of an exemplary input device, in accordance with embodiments of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention generally provide an input device having a smaller overall physical size and a lower production cost, and is minimally affected by electrical interference versus conventional input devices. One or more of the embodiments discussed herein include an input device that has a sensor controller disposed in close proximity to a plurality of sensing elements that comprise sensor electrodes that are used to acquire positional information of an input object. In one embodiment, the sensor controller and at least portions of the sensor electrodes are disposed between two transparent substrates that are positioned within a display device, or also referred to herein as a display module. In this configuration, the display device may be updated, while at the same time the presence of an input object can be detected by use of the sensor controller and the portion of sensor electrodes. In some embodiments, the sensor controller is disposed in an edge region of a substrate which has a sensing region within which the adjacently positioned sensor electrodes are configured to sense the presence of an input object.

FIG. 1 is a block diagram of an exemplary input device 100, in accordance with embodiments of the invention. In FIG. 1, the input device 100 is a proximity sensor device (e.g., "touchpad", "touch sensor device") configured to sense inputs provided by one or more input objects 140 positioned in a sensing region 120. Example input objects include fingers and styli, as shown in FIG. 1. In some embodiments of the invention, the input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include input device 100 and separate joysticks or key switches. Further examples of electronic systems 150 include peripherals, such as data input devices (e.g., remote controls and mice) and data output devices (e.g., display screens and printers). Other examples include remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system. As appropriate, the input device 100 may communicate with parts of the electronic system 150 using any one or more of the following:

buses, networks, and other wired or wireless interconnections. Examples include I²C, SPI, PS/2, Universal Serial Bus (USB), Bluetooth, RF, and IRDA.

Sensing region 120 encompasses any space above, around, in and/or near the input device 100 in which the input device 100 is able to detect user input by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 generally comprises one or more sensing elements 121 for detecting user input. As several non-limiting examples, the one or more sensing elements 121 in the input device 100 may use capacitive, elastive, resistive, inductive, magnetic acoustic, ultrasonic, and/or optical techniques to detect the position or motion of the input object(s) 140. Some implementations are configured to provide sensing images that span one, two, three, or higher dimensional spaces.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing elements 121 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the input device 100. Each module may comprise circuitry that is a part of the processing system 110, firmware, software, or a combination thereof. In various embodiments, different combinations of modules may be used. In one example, modules include hardware operation modules for operating hardware such as sensing elements and display screens, data processing modules for processing data, such as sensor signals, and positional information, and reporting modules for reporting information. In another example, modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. In one example, actions include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system process information received from the processing system 110 is used to act on user input, such as to facilitate a full range of actions, including mode changing actions and GUI actions. For example, in some embodiments, the processing system 110 operates the sensing element(s) 121 of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline set of data (e.g., baseline image), such that the information reflects a difference between the acquired electrical signals (e.g., sensing image) and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In general, the position of the input object 140 relative to the sensing region 120 is monitored or sensed by use of one or more sensing elements 121 (FIG. 1) that are positioned to detect its "positional information." In general, the sensing elements 121 may comprise one or more sensing elements or components that are used to detect the presence of an input object. As discussed above, the one or more sensing elements 121 of the input device 100 may use capacitive, elastive, resistive, inductive, magnetic acoustic, ultrasonic, and/or optical techniques to sense the position of an input object. While the information presented below primarily discuses the operation of an input device 100, which uses capacitive sensing techniques to monitor or determine the position of an input object 140 this configuration is not intended to be limiting as to the scope of the invention described herein, since other sensing techniques may be used.

In some resistive implementations of the input device 100, a flexible and conductive first layer is separated by one or more spacer elements from a conductive second layer. During operation, one or more voltages are applied between adjacent layers. When an input object 140 touches the flexible first layer it may deflect sufficiently to create electrical contact between the layers, resulting in current or voltage outputs reflective of the point(s) of contact between the layers. These resulting current or voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information of the input object 140 positioned over the sensing region 120.

In one embodiment of the input device 100, the sensing element 121 is a capacitive sensing element that is used to sense the position of the input object(s). In some capacitive implementations of the input device 100, voltage or current is applied to the sensing elements to create an electric field between an electrode and ground. Nearby input objects 140 cause changes in the electric field, and produce detectable changes in capacitive coupling that may be detected as changes in voltage, current, or the like. Some capacitive implementations utilize arrays or other regular or irregular patterns of capacitive sensing elements to create electric fields. In some capacitive implementations, portions of separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between one or more sensing elements, or one or more sensor electrodes, and an input object. In various embodiments, an at least partially grounded input object positioned near the sensor electrodes alters the electric field near the sensor electrodes, thus changing the measured capacitive coupling of the sensor electrodes to ground. In one implementation, an absolute capacitance sensing method operates by modulating sensor electrodes with respect to a reference voltage (e.g., system ground), and by detecting the capacitive coupling between the sensor electrodes and the at least partially grounded input object(s).

Some capacitive implementations utilize "mutual capacitance" (or "transcapacitance") sensing methods based on changes in the capacitive coupling between two or more sensing elements (e.g., sensor electrodes). In various embodiments, an input object near the sensor electrodes alters the electric field created between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

Figure 2:
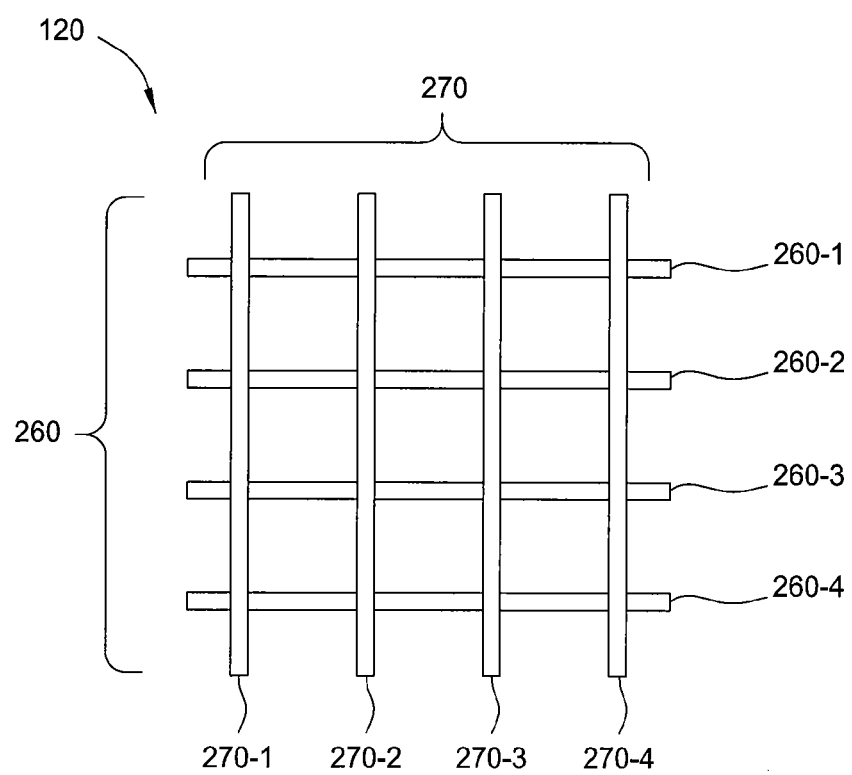
FIG. 2 is a schematic view of a portion of a sensor electrode pattern that may be utilized to generate all or part of the sensing region of an input device, according to one or more of the embodiments described herein.

FIG. 2 is a schematic top view of a portion of the input device 100 that illustrates a portion of a sensor electrode pattern that may be used to sense the positional information of an input object within the sensing region 120. For clarity of illustration and description, FIG. 2 illustrates a pattern of simple rectangles, and does not show all of the interconnecting features and/or other related components. While FIG. 2 illustrates a pattern of simple rectangles, this is not meant to be limiting and in other embodiments, various sensor electrode shapes may be used. In other some embodiments, sensor electrodes 260 and sensor electrodes 270 may be similar in size and/or shape. In one example, as shown, these sensor electrodes are disposed in a sensor electrode pattern that comprises a first plurality of sensor electrodes 260 (e.g., sensor electrodes 260-1, 260-2, 260-3, etc.) and a second plurality of sensor electrodes 270 (e.g., sensor electrodes 270-1, 270-2, 270-3, etc.), which may disposed above, below, or on the same layer as the first plurality of sensor electrodes 260. One will note that the sensor electrode pattern of FIG. 2 may alternatively utilize various sensing techniques, such as mutual capacitive sensing, absolute capacitive sensing, elastive, resistive, inductive, magnetic acoustic, ultrasonic, or other useful sensing techniques, without deviating from the scope of the invention described herein.

Sensor electrodes 260 and sensor electrodes 270 are typically ohmically isolated from each other. That is, one or more insulators separate sensor electrodes 260 and sensor electrodes 270 and prevent them from electrically shorting to each other in regions where they may overlap. In some embodiments, sensor electrodes 260 and sensor electrodes 270 are separated by electrically insulative material disposed between them at cross-over areas. In such configurations, the sensor electrodes 260 and/or sensor electrodes 270 may be formed with jumpers connecting different portions of the same electrode. In some embodiments, sensor electrodes 260 and sensor electrodes 270 are separated by one or more layers of electrically insulative material. In some other embodiments, sensor electrodes 260 and sensor electrodes 270 are separated by one or more substrates, for example, they may be disposed on opposite sides of the same substrate, or on different substrates that are laminated together. In other some embodiments, sensor electrodes 260 and sensor electrodes 270 may be similar in size and shape. In various embodiments, as will be discussed in more detail later, sensor electrodes 260 and sensor electrodes 270 may be disposed on a single layer of a substrate. In yet other embodiments, other electrodes, including but not limited to, a shield electrode(s) may be disposed proximate to either sensor electrodes 260 or 270. The shield electrode may be configured to shield sensor electrodes 260 and/or sensor electrodes 270 from interference such as nearby sources of driven voltages and/or currents. In some embodiments, the shield electrode(s) may be disposed with sensor electrodes 260 and 270 on a common side of a substrate. In other embodiments, the shield electrode(s) may be disposed with sensor electrodes 260 on a common side of a substrate. In other embodiments, the shield electrode(s) may be disposed with sensor electrodes 270 on a common side of a substrate. In yet other embodiments, the shield electrode may be disposed on a first side of a substrate while sensor electrodes 260 and/or sensor electrodes 270 are disposed on a second side, opposite the first.

In one embodiment, the areas of localized capacitive coupling between sensor electrodes 260 and sensor electrodes 270 may be termed "capacitive pixels." The capacitive coupling between the sensor electrodes 260 and sensor electrodes 270 change with the proximity and motion of input objects in the sensing region associated with the sensor electrodes 260 and sensor electrodes 270.

In some embodiments, the sensor pattern is "scanned" to determine these capacitive couplings. That is, the sensor electrodes 260 are driven to transmit transmitter signals. The input device 100 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of sensor electrodes 270 to be independently determined. The sensor electrodes 270 may be operated singly or multiply to acquire resulting signals. The resulting signals may be used to determine measurements of the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. Multiple capacitive images may be acquired over multiple time periods, and differences between them used to derive information about input object(s) in the sensing region. For example, successive capacitive images acquired over successive periods of time can be used to track the motion(s) of one or more input objects entering, exiting, and within the sensing region. In various embodiments, the sensing image, or capacitive image, comprises data received during a process of measuring the resulting signals received with at least a portion of the sensing elements 121 distributed across the sensing region 120. The resulting signals may be received at one instant in time, or by scanning the rows and/or columns of sensing elements distributed across the sensing region 120 in a raster scanning pattern (e.g., serially poling each sensing element separately in a desired scanning pattern), row-by-row scanning pattern, column-by-column scanning pattern or other useful scanning technique. In many embodiments, the rate that the "sensing image" is acquired by the input device 100, or sensing frame rate, is between about 60 and about 180 Hertz (Hz), but can be higher or lower depending on the desired application.

In some touch screen embodiments, the sensor electrodes 260 and/or the sensor electrodes 270 are disposed on a substrate of the associated display device. For example, the sensor electrodes 260 and/or the sensor electrodes 270 may be disposed on a polarizer, a color filter substrate, or a glass sheet of an LCD. As a specific example, the sensor electrodes 260 may be disposed on a TFT (Thin Film Transistor) substrate of an LCD, and may or may not also be used in display operations of the display device. As another example, the receiver electrodes 270 may be disposed on a color filter substrate, on an LCD glass sheet, on a protection material disposed over the LCD glass sheet, on a lens glass (or window), and the like.

In some touchpad embodiments, the sensor electrodes 260 and/or the sensor electrodes 270 are disposed on a substrate of the touchpad. In such an embodiment, the sensor electrodes and/or the substrate may be substantially opaque. In one embodiment, an opaque material may be disposed between the sensor electrodes, the substrate and/or the surface of the input region 120. In some embodiments, the substrate and/or the sensor electrodes may comprise a substantially transparent material. In various embodiments, one or more substrates of the touchpad may be textured to facilitate improved user input.

In those embodiments, where sensor electrodes 260 and/or sensor electrodes 270 are disposed on a substrate within the display device (e.g., color filter glass, TFT glass, etc.), the sensor electrodes may be comprised of a substantially transparent material (e.g., ITO, ATO) or they may be comprised of an opaque material and aligned with the pixels of the display device (e.g., disposed such that they overlap with the "black mask" between pixel dots or a subpixel of the pixel).

Figure 3A:
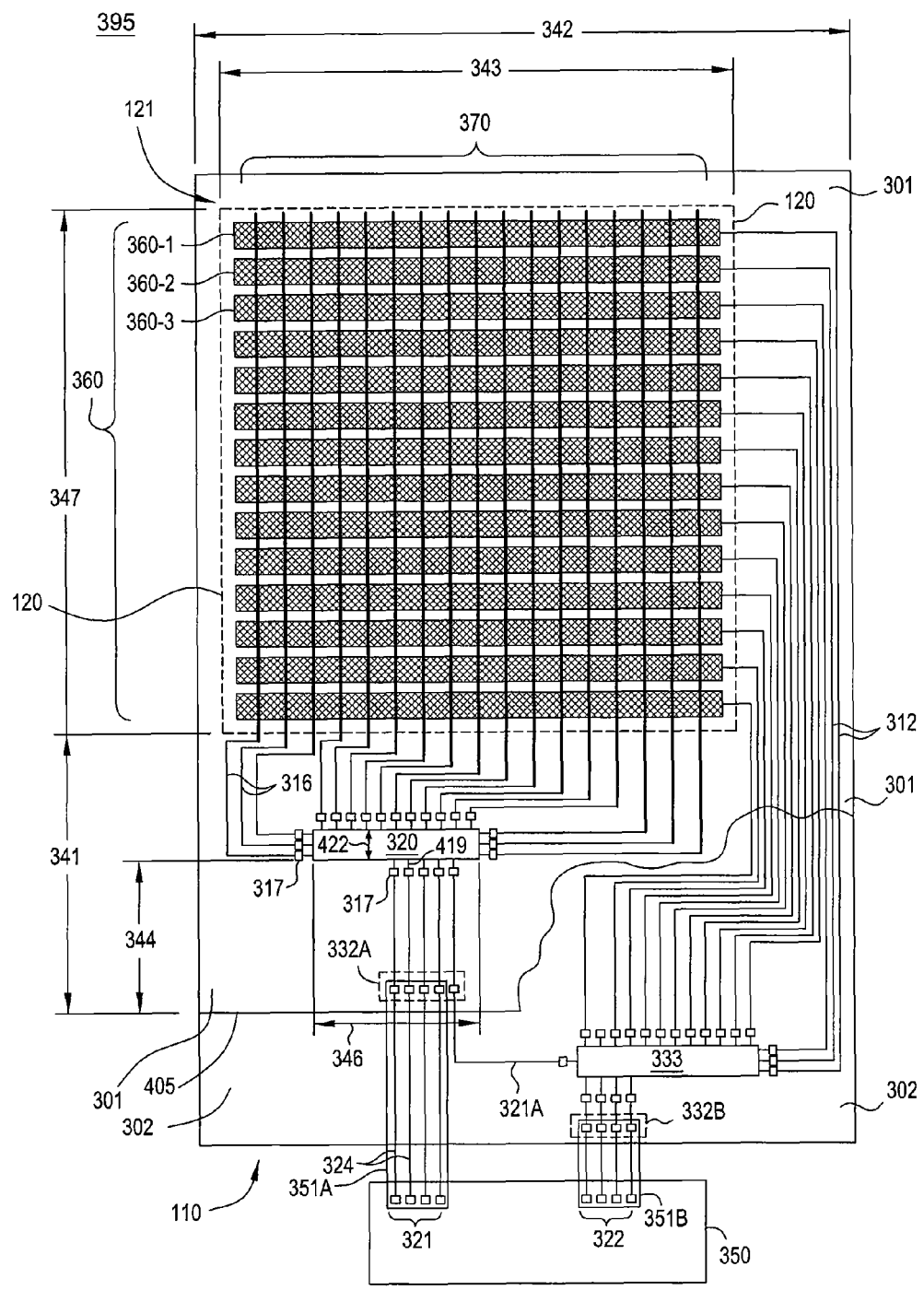
FIG. 3A is a schematic diagram illustrating one example of an input device, according to one or more of the embodiments described herein.

In some touch screen embodiments, as shown in FIG. 3A, transmitter electrodes comprise one or more common electrodes (e.g., segments of a segmented "V-com electrode"), hereafter common electrodes 360, used in updating the display of the display screen. These common electrodes (e.g., reference numerals 360-1, 360-2, 360-3, . . . 360-16 shown in FIG. 3A) may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode comprises one or more common electrodes 360.

In one configuration, as illustrated in FIG. 3A and further discussed below, a sensor controller 320 is coupled with the receiver electrodes 370, and is configured to receive resulting signals from receiver electrodes 370. In this configuration, a display controller 333 is coupled to the common electrodes 360, and comprises display circuitry (not shown) configured for updating the display device that is positioned proximate to the receiver electrodes 370. The display controller is configured to apply one or more pixel voltage(s) to the pixel electrodes through pixel source drivers (not shown). The display controller is also configured to apply one or more common drive voltage(s) to the common electrodes 360, and operate them as common electrodes for updating the display device. In some embodiments (e.g., line inversion embodiments), the display controller is also configured to invert the common drive voltage in synchronization with a drive cycle of the image display. The display controller 333 is also configured to operate the common electrodes 360 as transmitter electrodes for capacitive sensing. In one embodiment the common electrodes 360 are configured to be scanned while the receiver electrodes 370 are receiving a signal from the common electrodes 360. In some configurations, the receiver electrodes 370 may be similar to the sensor electrodes 270 that are discussed above.

While the processing system 110 illustrated in FIG. 3A comprises two ICs, the processing system 110 may be implemented with more or less ICs to control the various components in the input device 395. For example, the functions of the sensor controller 320 and the display controller 333 may be implemented in one integrated circuit that can control the display module elements (e.g., common electrodes 360) and drive and/or sense data delivered to and/or received from the sensor electrodes, which may comprise the receiver electrodes 370 and common electrodes 360. In various embodiments, calculation and interpretation of the measurement of the resulting signals may take place within the sensor controller 320, display controller 333, a host controller 350, or some combination of the above. One will note that the input device 395 may be formed as part of a larger input device 100, which is discussed above. In some configurations, the processing system 110 may comprise a transmitter circuitry, receiver circuitry, and memory that is disposed within one or any number of ICs found in the processing system 110, depending to the desired system architecture.

Figure 3B:
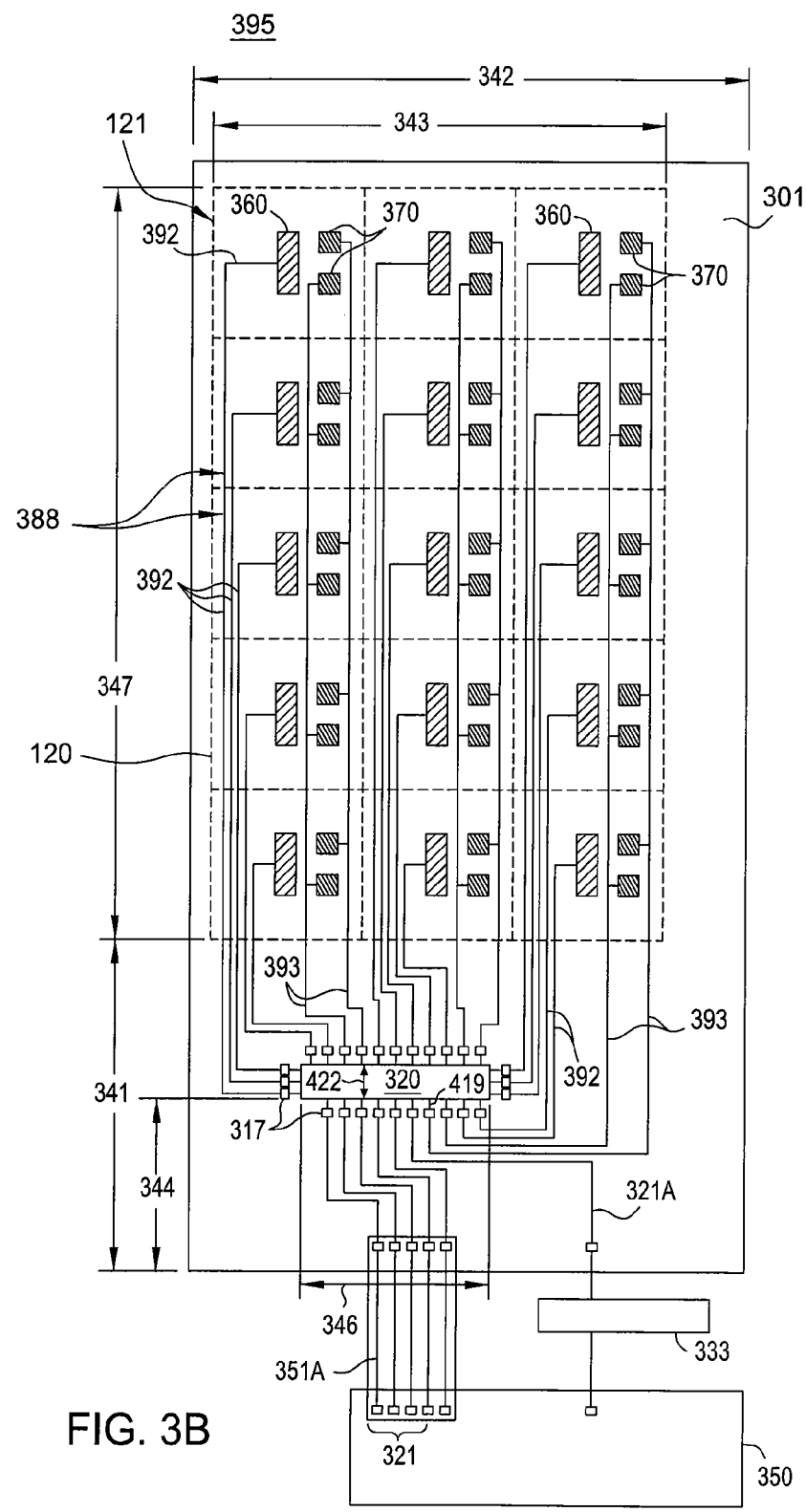
FIG. 3B is a schematic diagram illustrating one example of an input device, according to one or more of the embodiments described herein.

In another embodiment, as shown in FIG. 3B, the sensor electrodes may comprise a plurality of transmitter and receiver electrodes that are formed in a single layer on a surface of a substrate 301. In one configuration of the input device, each of the sensor electrodes may comprise one or more transmitter electrodes 360 that are disposed proximate to one or more receiver electrodes 370. A transcapacitive sensing method using the single layer design, may operate by detecting the change in capacitive coupling between one or more of the driven transmitter sensor electrodes 360 and one or more of the receiver electrodes 370, as similarly discussed above. In such embodiments, the transmitter and receiver electrodes may be disposed in such a way such that jumpers and/or extra layers used to form the area of capacitive pixels are not required. In various embodiments, the transmitter electrodes 360 and receiver electrodes 370 may be formed in an array on the surface of a substrate 301 by first forming a blanket conductive layer on the surface of the substrate 301 and then performing an etch patterning process (e.g., lithography and wet etch, laser ablation, etc.) that ohmically isolates each of the transmitter electrodes 360 and receiver electrodes 370 from each other. In other embodiments, the sensor electrodes may be patterned using deposition and screen printing methods. As illustrated in FIG. 3B, these sensor electrodes may be disposed in an array that comprises a rectangular pattern of transmitter electrodes 360 and receiver electrodes 370. In one example, the blanket conductive layer used to form the transmitter electrodes 360 and receiver electrodes 370 comprises a thin metal layer (e.g., copper, aluminum, etc.) or a thin transparent conductive oxide layer (e.g., ATO, ITO) that is deposited using convention deposition techniques known in the art (e.g., PVD, CVD). In various embodiments, patterned isolated conductive electrodes (e.g., electrically floating electrodes) may be used to improve visual appearance. In yet other embodiments, jumpers and vias on a second conductive layer may be used to connect separately patterned layers.

Input Device Configurations

In many embodiments, due to the often substantially large number of sensing elements (e.g., sensor electrodes) that may be used to determine the positional information of an input object, and the substantially large number of connections that may be used to connect each of these sensing elements to the various transmitters and receivers in a processing system, proximity sensor devices physically separate the components associated with the sensing region 120 portion of the device (e.g., sensor electrodes, display image generating device) from the electronics that is used to control these components. Therefore, in many embodiments proximity sensor devices may distribute the various elements that are adapted to control the proximity sensing device on to multiple different printed circuit boards and then separately connect these various elements to each other using flexible wiring harnesses and connectors. In many embodiments, due to the large number of separate conductive routing traces that are connected to the various electronic components in the processing system 110, for example, greater than 50 separate conductive routing traces for 7 inch touch screen, the interconnecting components, such as the flex-cable, multi-pin connectors and other supporting components that contain these conductive routing traces, may account for a large percentage (e.g., >50%) of the piece-part and manufacturing cost of at least one of the formed proximity sensor device and the connections. As noted above, the reliability of the system and the overall size of the proximity sensor device are often made undesirably large due to the presence of the large number of connectors and connection points found in many proximity sensor devices. Furthermore, in various embodiments, the cost and flexibility of a large flexible connector with many connections may be reduced. Also, in various embodiments, the multilayer flexible interconnections and larger connections to the substrate (e.g., Anisotropic Conductive Film (ACF), to a glass substrate) may substantially increase the cost of the sensor design.

As noted above, many embodiments will also provide an input device that has an improved accuracy, speed and reliability, due to the minimized number of connection points, number of connectors, length of the conductive routing traces and complexity of the flexible circuit elements achieved by positioning a sensor controller 320 (FIGS. 3A-3B) within the structure used to form the input device 395. One or more of the embodiments discussed herein include the mounting of a sensor controller 320 in close proximity to a plurality of sensor electrodes that are used to sense and acquire positional information of an input object over the sensing region 120.

Figure 4A:
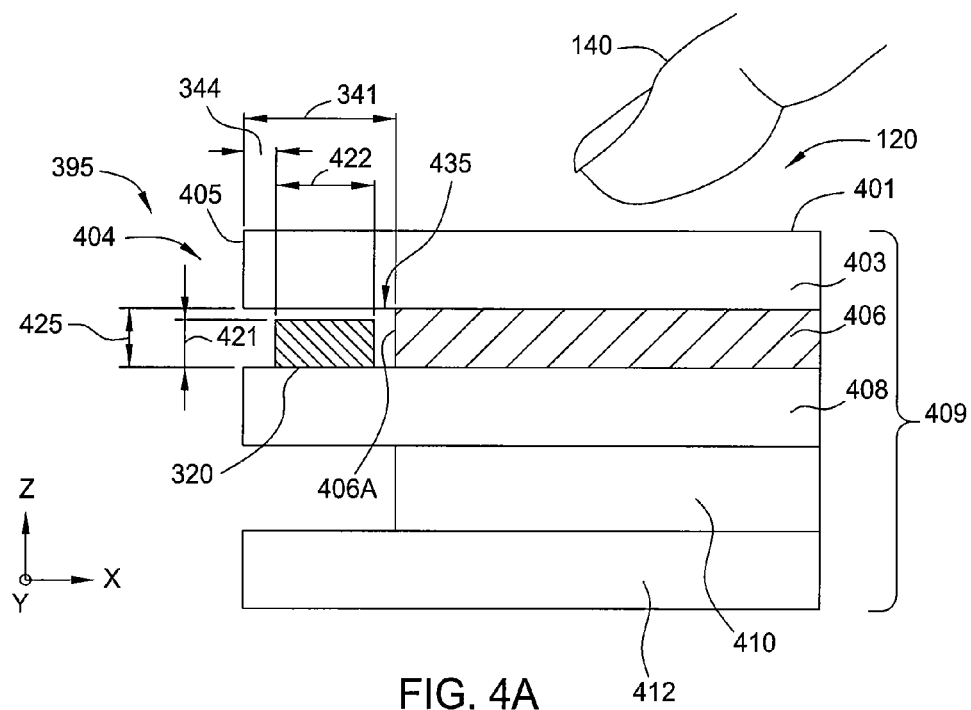
FIG. 4A is a partial side cross-sectional view of an input device used to sense an input object, according to one or more of the embodiments described herein.
Figure 4B:
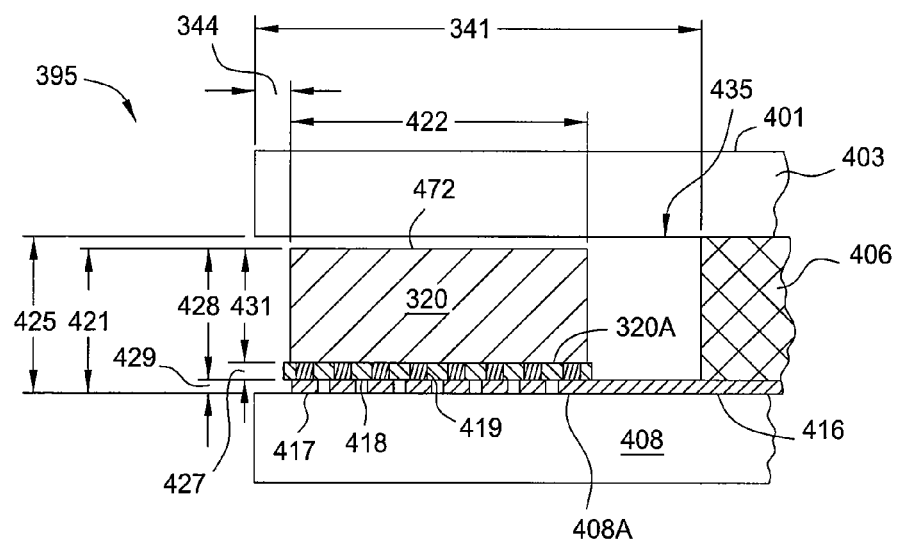
FIG. 4B is an enlarged side cross-sectional view of an input device used to sense an input object, according to one or more of the embodiments described herein.

In one embodiment of the input device 395, as shown in FIGS. 4A and 4B, the sensor controller 320 and at least portions of the sensor electrodes are disposed between two transparent substrates. In one embodiment, the sensor electrodes are disposed between two substrates, where at least one of the substrates is opaque. For example, one substrate may be an opaque facesheet and/or a mounting member. In various embodiments, the facesheet may be comprised of multiple layers including adhesive layers, plastic layers and/or glass layers. In one embodiment the sensor controller 320 and at least a portion of the sensor electrodes are disposed between two transparent substrates that are proximate an optional display element 409. In one embodiment, display element 409 is updated, while the positional information of an input object can be detected by the sensor controller 320 and a portion of sensor electrodes. In some embodiments, the sensor controller 320 is disposed in an edge region of a substrate that is adjacent to a sensing region 120 through which the adjacently positioned sensor electrodes (not shown), which are disposed in sensor electrode layer(s) 406, are configured to sense the presence of an input object 140.

FIG. 4A is a schematic cross-sectional view of one embodiment of a sensor device 404 that can be used to sense an input object 140 that is within the sensing region 120. The input surface 401 may be provided by a first substrate 403, such as a lens or a facesheet, which may comprise a glass or plastic material (and may be opaque or transparent), that is disposed between the input object 140 and sensor electrode layer(s) 406 of the sensor device 404. The sensor electrode layer(s) 406 may comprise one or more layers that contain an array of sensor electrodes, which are used to determine the positional information of the input object 140 by use of the sensor controller 320 that is disposed proximate to these sensor electrodes. In one embodiment, the input device may comprise a first substrate having a front surface and a rear surface formed on a side of the first substrate opposite to the front surface, wherein the front surface is on a side of the first substrate on which an input object is disposed. In many embodiments, a substrate may comprise multiple layers including adhesive layers, substantially rigid layers, substantially flexible layers, substantially opaque layers, substantially transparent layers and the like. The input device further comprises a second substrate having a first surface, and a sensor controller communicatively coupled to a plurality of sensor electrodes. In one embodiment, at least a portion of the sensor controller and a portion of the plurality of sensor electrodes are disposed in a volume defined by a region of overlap between the rear surface of the first substrate and the first surface of the second substrate. In one embodiment, the first and/or the second substrate may be transparent. In another embodiment, the first and/or the second substrate may be opaque. In one embodiment, the sensor controller and a portion of the sensor electrodes are disposed on the rear surface of the first substrate. In another embodiment, the sensor controller and a portion of the senor electrodes are disposed on the first surface of the second substrate. In one embodiment the second substrate may be configured as a "stiffener" substrate.

The sensor controller 320 may comprise sensor circuitry that is able to receive process and/or transmit analog or digital signals to the various electrical components found in the input device 395 to process, distribute and/or control at least a portion of the positional information received from an input object 140 disposed in the sensing region 120. The sensor controller 320 may comprise sensor circuitry that contains a plurality of logic elements, flip-flops, multiplexers, operational amplifiers, A/D converts, D/A converters, current scalers, mixers and/or other useful circuit elements that are connected in a desired way to perform some part of the process of sensing an input object 140. The sensor controller 320 is generally configured to receive input from the various components found in the input device 395, process the received inputs and deliver control or command signals when necessary to perform a desired portion of the process of sensing the positional information of an input object 140.

In many embodiments, off-the-shelf IC chips that could be adapted to form the sensor controller 320 generally includes an IC device that comprises a device package that includes a die and a plurality of leads bonded to the connection points formed on a face of the die, which are all at least partially encapsulated within a dielectric material to protect the die and connection points from the external environment. The die in the off-the-shelf IC device is generally formed from a larger semiconductor wafer that has been sectioned, or cleaved, after the various device IC layers have been formed thereon to form a functioning integrated circuit device. These IC components, which are used to receive and process signals from the sensing elements, are typically remotely positioned on a separate printed circuit board (PCB), due to their size (e.g., lateral space covered on a PCB). In various embodiments, a Surface Mount Technology, SMT, process may be used when positioning components on a PCB. By distancing these IC components from the sensing elements in the input device, it may become more susceptible to electromagnetic interference (EMI) that is generated by the other supporting components, such as liquid crystal display (LCD) components, which are position near or within the input device 100. However, as noted above, due to the size and thickness of the formed off-the-shelf IC components it is generally not possible to position the off-the-shelf IC device any closer than a position adjacent to the edge 405 of the first substrate 403 making the input device 395 significantly larger in width (X-direction in FIG. 4A) than desirable for most consumer and industrial electronic applications. In most common applications it is desirable for the border region width 341 (FIG. 4), or bezel region, to be less than about 5 millimeters (mm), such as less than about 3 mm, and more typically less than about 2 mm. The border region width 341 is generally defined as the as the portion of the input device 395 that extends from the outermost edge 406A of the sensing elements disposed in the sensor element layer 406, or outer edge of the display screen (e.g., edge of display element layer 410) found in the display device 409, to the edge 405 of the sensor device 404.

Therefore, in some embodiments, the input device 395 comprises a sensor electrode layer 406, which contains one or more layers that contain an array of sensor electrodes, and the sensor controller 320 that is at least partially disposed within a volume 435 formed between the first substrate 403 and the second substrate 408 of the sensor device 404. In one embodiment, the first substrate is a transparent substrate that comprises a glass material that is between about 0.2 mm and 1.0 mm thick, or is a plastic material that is between about 0.2 mm and 1.5 mm thick. In another embodiment, the substrate is an opaque substrate. In one configuration of the sensor device 404, the second substrate 408 may be a transparent substrate, such as a color filter glass substrate, which is between about 0.2 mm and 1.0 mm thick. In various embodiments, the second substrate (e.g., second substrate 502) may be substantially flexible. For example, in one embodiment, the second substrate may be around 0.05 mm to 0.2 mm thick. The second substrate 408 may be disposed near or coupled to components that form at least part of the display device 409. In one example, the display device 409 comprises a display element layer 410, such as a layer containing field effect-affected display materials (e.g., liquid crystal (LC), organic light emitting diode (OLED) or other display materials that are affected by an electric field or current) and a third substrate 412 (e.g., TFT glass or sealing material). The sensor electrode layer(s) 406, in one configuration, may comprise a single layer that contains transmitter 392 (FIG. 3B) and receiver electrodes 391 (FIG. 3B) that are disposed between the first substrate 403 and a second substrate 408. In another configuration, the sensor electrode layer(s) 406 comprises one or more layers that contain the receiver and transmitter electrodes, a polarizer film layer (not shown), an anti-static film layer and/or an anti-shatter film layer (not shown) that are disposed between the first substrate 403 and a second substrate 408. In various embodiments, the polarizer film layer may comprise a circular polarizer configured to reduce the visibility of the sensor electrodes patterned below. Further, while not shown in the FIGS. 4A-4B, in various embodiments an air gap may be located within the input device. For example, an air gap may be between first substrate 403 and sensor electrode layer 406, between sensor electrode layer 406 and second substrate 408, between second substrate 408 and display element layer 410 and/or between display element layer 410 and third substrate 412. In yet another configuration, the sensor electrode layer(s) 406 comprises a first layer (not shown) that contains the receiver electrodes, while the transmitter electrodes are disposed within one of the layers in the display device 409.

In one embodiment of the invention, the sensor electrode layer(s) 406 comprise at least a plurality of receiving electrodes (e.g., electrodes 370) and at least one of an anti-shatter film layer, anti-static film layer and a polarizer film layer, and thus a distance 425 defined between the first substrate 403 and the second substrate 408 is typically less than about 0.5 mm in thickness, and more typically less than about 200 micro-meters (μm), and in some cases less than about 150 μm. Therefore, in one embodiment of an input device, the sensor controller 320 is disposed at least partially within the volume 435 defined by the distance 425 (FIG. 4) between the substrates 403, 408, the border region width 341 (FIG. 4) and length of the border region of the smaller of the two substrates 403, 408, such as the length 342 (FIGS. 3A-3B) of the substrate 301, where substrate 301 illustrated in FIGS. 3A-3B is either the first substrate 403 or the second substrate 408 shown in FIG. 4. The sensor controller 320 may be bonded to a surface of the first substrate 403 or the second substrate 408 using a conventional chip-on-glass (COG) or chip-on-film (COF) bonding technique. In various embodiments, the sensor controller 320 may have conductive "bumps" to aid in the contacts for COG or COF bonding. Further, the sensor controller 320 may have a conductive rerouting layer and a patterned dielectric formed on top of the silicon wafer die. As will be discussed further below, the sensor controller 320 may be directly or indirectly coupled to the traces or interconnecting elements that are coupled to the sensor electrodes disposed within the sensor electrode layer 406, which is disposed within the distance 425 formed between the first substrate 403 and second substrate 408.

FIG. 4B is an enlarged side cross-sectional view of a portion of the sensor device 404 that schematically illustrates the position and electrical connections made to the sensor controller 320 that is bonded to the surface 408A of the second substrate 408, according to one embodiment of the invention. In this configuration, the sensor device 404 generally comprises the sensor controller 320 that is electrically coupled to a sensor electrode layer 417 and bonded to surface 408A of the second substrate 408 by use of an anisotropic-conductive-layer (ACF) film 418. In various embodiments, other methods may include, but are not limited to, metallic eutectic bonding, SMT and wire bonding. In many embodiments, the sensor controller 320 includes a plurality of connection points 419 (e.g., solder bumps) that are bonded to the electrical elements formed on or within a portion of the surface 320A of the IC portion of the sensor controller 320, and are each separately electrically coupled to portions of the sensor electrode layer 417. In many embodiments, the connection points 419 comprise a plurality of discrete metal regions that have a height 427 that is between about 5 and 50 μm thick. In various embodiments, the connection points 419 may be spaced in a desired pattern along the surface 320A of the sensor controller 320 at pitch of about 10-50 μm, and includes at least as many connections as required to receive and transmit signals to the other components in the processing system 110.

The sensor electrode layer 417 generally comprises a thin metal layer (e.g., aluminum, copper, molybednum) or a thin transparent conductive oxide (TCO) layer (e.g., ITO, ATO) that has a thickness 429 that is between about 0.1 and 10 μm thick and may be deposited using convention deposition techniques known in the art. In one embodiment, each of the connection points 419 in the sensor controller 320 are directly coupled to one or more parts of the sensor electrode layer 417, such as part of a single layer electrode assembly 416, which may include the receiver electrodes 391 and/or transmitter electrodes 392. As discussed further below, one will note that the single layer electrode assembly 416 and sensor controller 302 need not be disposed on and/or bonded to the second substrate 408 and, thus, both can be disposed on and/or bonded to a surface of the first substrate 403.

In one embodiment of the sensor device 404, the total thickness 428 of the sensor controller 320 is thinned by chemical mechanical polishing or grinding the rear surface 472 of the sensor controller 320 so that its final overall thickness is less than or equal to the distance 425 defined between the substrates 403 and 408. In one configuration, the sensor controller 320 may comprise an IC chip that comprises multiple layers of patterned conductive and dielectric layers that are formed from a monocrystalline silicon substrate to form the various discrete semiconductor devices in the integrated circuit device. In one embodiment, the total thickness 428 of the sensor controller 320 is less than or equal to the distance 425 minus a thickness 429 of the sensor electrode layer 417. The total thickness 428 may in some cases comprise the height 427 of the connection points 419 and the thickness 431 of the IC portion of the sensor controller 320. In one example, the thickness 428 of the IC chip portion of the sensor controller 320 is thinned to a thickness less than or equal to about 500 µm, such as less than about 300 µm. In another example, the thickness 428 of the IC chip portion of the sensor controller 320 is thinned to a thickness that is less than or equal to about 200 µm. Also, in some configurations, the connection points 419 may not be disposed over the sensor electrode layer 417 as shown in FIG. 4B, and thus the thickness of the sensor controller 320 could be adjusted to equal to the thickness 421, which is equal to or less than the distance 425, as discussed above.

Referring to FIGS. 3A and 3B, the sensor controller 320 can also be configured so that it will fit within an open lateral region (e.g., X-Y plane in FIG. 4A) of a substrate 301, which is defined by the size of the border region width 341 and the length 342 of the substrate 301. Therefore, in some embodiments of the invention, the sensor controller 320 is formed in rectangular shape, wherein the rectangular shape includes a length 346 (FIGS. 3A-3B) and the lateral width 422 (FIGS. 3A-4B), which are each measured in a direction that is perpendicular to the thickness 428 (FIG. 4). In many embodiments, the length 346 will be less than the length 342 (FIG. 3A-3B) of the substrate on which the sensor controller 320 is disposed and the lateral width 422 is smaller than the size of the border region width 341 between the ends of the receiver electrodes and edge of the substrate. In one example, the length 346 is between about 5 and 15 mm and the lateral width 422 is between about 1 and about 5 mm. In one example, the sensor controller 320 is disposed a distance 344, such that it is in the border region of the input device 395. In one embodiment, the sensor controller 320 is disposed a distance 344 such as between about 0 and 3 mm from an edge 405 (FIGS. 3A and 4A) of a substrate, such as the first substrate 403. In other embodiments, the distance 344 may be greater than 3 mm. One will note that FIGS. 3A-3B are intended to be schematic representations of the interconnections and layout of the various components in the input device 395, and thus is not drawn to scale or intended to limit the orientation or positioning of the various components on a surface of a substrate disposed in the input device 395. For example, the conductive routing traces 312 and 316 are generally shown to be much larger than necessary to more clearly highlight how the various components in the input device 395 are connected together. In one embodiment, to reduce the border region and to reduce the area of the first substrate, i.e., the lens, the sensor controller 320 may be configured to have a rectangular shape with a relatively large aspect ratio (e.g., having a width of less than about 2 mm and a length of more than about 4 mm).

In one embodiment, as illustrated in FIGS. 3A-3B, the processing system 110, which is configured to operate the hardware in the input device 395, comprises the plurality of sensor electrodes, the sensor controller 320 and a display controller 333. In another embodiment the processing system 110, which is configured to operate the hardware in the input device 395, comprises the plurality of sensor electrodes, the sensor controller 320, a host controller 350 and a display controller 333. In one embodiment, the display controller 333 may be part of the host controller 350. In many embodiments, the host controller 350 will also include the other necessary components used to form at least part of the electronic system 150, which is discussed above.

In one configuration, as illustrated in FIG. 3A, the sensor controller 320 and the sensor electrodes (e.g., receiving electrodes 370) are disposed on a first substrate, or substrate 301 (e.g., substrate 403 or 408 in FIG. 4A), and the display controller 333 is disposed on a second substrate, such as substrate 302 (e.g., substrate 408 or 412 in FIG. 4A), which is different than the first substrate. In another configuration, as illustrated in FIG. 3B, the sensor controller 320, the receiving electrodes 370 and transmitter electrodes 360 are disposed on a first substrate, or substrate 301 (e.g., substrate 403 or 408 in FIG. 4A), and the display controller 333 is disposed on a second substrate (e.g., substrate 408 or 412 in FIG. 4A), which is different than the first substrate. In some embodiments, the sensor controller 320 is adapted to communicate with the host 350 using communication lines 321 that pass through a connector 332A and a flexible circuit 351A, and the display controller 333 is adapted to communicate with the host 350 using communication lines 322 that pass through a connector 332B and a flexible circuit 351B. The flexible circuit members 351A and 351B may be a conventional flex-tail that comprises a flexible dielectric material that has a plurality of conductive traces formed on one or more layers. The communication lines 321, 322 may be adapted to provide a system ground path and transmit one or more of the following power, clock/synchronization information, reference signals and multiplexed signals between the sensor controller 320 and the host 350 or the display controller 333 and the host 350, respectively.

In one embodiment of the processing system 110, the sensor controller 320 is adapted to receive the signals from the receiver electrodes (e.g., electrodes 370) and communicate with the display controller 333 through one or more communication lines that may be formed on a the flexible circuit member that connects the two controllers. The flexible circuit member may be a conventional flex-tail that comprises a flexible dielectric material that has a plurality of conductive traces formed on one or more layers. The communication lines are formed in the flexible circuit member and may be adapted to transmit one or more of the following power, clock/synchronization information, reference signals and multiplexed signals between the display controller 333 and the sensor controller 320, and also provide a system ground path. In some cases, the clock/synchronization information is information that synchronizes the processes that the sensor controller 320 performs with the other components in the display controller 333, and this information may be delivered between the devices by use of a communication link 321A. In one embodiment, the communication link 321A comprises a plurality of conductive routing traces (not shown) that are each separately coupled to a connection point on the sensor controller 320 and a connection point on the display controller 333. For example, the synchronization information may synchronize display updating and capacitive sensing by providing a synchronized clock, information about display update state, information about the capacitive sensing state, direction to display update circuitry to update (or not to update), direction to capacitive sensing circuitry to sense (or not to sense), and/or the like. In one embodiment, each of the transmitter electrodes (e.g., electrodes 360 in FIG. 3A) are connected to the display controller 333 through conductive routing traces 312 that may be formed on a substrate found in the input device 395, such as substrate 302 (FIG. 3A). Also, in some cases, the sensor controller 320 may contain at least part of the control electronics used to form the display controller 333 that are used to deliver a signal to the common electrodes 360 (FIG. 3A) to update the display device.

As noted above, an input device 100 may have 50 different connections that are coupled to the sensor controller 320 to perform the process of sensing the positional information of an input object. For example, in one embodiment, separate vectors of transmitter electrode contacts may be made for each receiver electrode (or group of receiver electrodes) in a single layer sensor. Thus, in one configuration, this large number of connections can all be made within the region of the substrate 301 when the sensor controller 320 is disposed thereon, versus a configuration where the communication lines are run to the sensor controller 320 that is positioned external to the substrate 301. Therefore, the number of separate signal lines that need to run to components external to the substrate 301 can be reduced to a small number of connections, such as the number of communication lines 321. The reduced number of connections external to the substrate 301 can greatly reduce the cost and complexity of the formed input device 395. One will note that by positioning the sensor controller 320 on the substrate 301 makes the connectors used to connect the circuit elements (e.g., electrodes 360, electrodes 370) formed on the substrate 301 with sensor controller or other components external to the substrate (e.g., host 350) much smaller in size, increases the communication speed of the system, and reduces the cost and complexity of the input device 100.

In an alternate embodiment of the input device 395, as illustrated in FIG. 3B, all of the sensor electrodes, such as the receiver electrodes 370 and the transmitter electrodes 360, are coupled to the sensor controller 320. In this configuration, the sensor controller 320 is adapted to transmit transmitter signals with the transmitter electrodes and receive resulting signals with the receiver electrodes for the determination of the positional information of an input object 140 in the sensing region 120.

Referring to FIG. 3B, in one embodiment, the receiver electrodes 370 are each connected to the sensor controller 320 by use of the conductive routing traces 393. Further, each transmitter electrodes 370 is also connected to the sensor controller 320 by the use of conductive routing traces 392. In one example, the receiver electrodes 370, transmitter electrodes 360, conductive routing traces 392 and 393, are all formed from a patterned single conductive layer (e.g., copper, aluminum, ATO, ITO) that is formed on a surface of a substrate 301. In one embodiment, the conductive routing traces 392 and 393 are disposed on a first substrate (or first transparent substrate) or a second substrate (or second transparent substrate). Further, in various embodiments, the conductive routing traces may be coupled with sensor controller 320 without the use "jumpers" or "cross-overs" within the sensing region or within the border region. In one embodiment, the conductive routing traces 392, 393 are coupled with sensor controller 320, such that any external connections (e.g., flexible circuit 351A) may be connected to the sensor controller 320. For example, the conductive routing traces may be coupled to a first, second and/or third edge of the sensor controller 320 and the flexible circuit may be coupled to a fourth edge of the sensor controller. In one embodiment, the conductive routing traces may be coupled to the same edge of the sensor controller 320 as the flexible circuit is connected. In one embodiment, the edge of the sensor controller 320 that is coupled with the flexible circuit is proximate an edge of the substrate on which sensor controller 320 is disposed.

While FIG. 3B illustrates a configuration of the transmitter electrodes 360 and receiver electrodes 370, this configuration is not intended to limit the disclosure herein, since each of these electrodes can be configured so that they are electrically isolated from each other, connected in groups or any other desired electrical connection configuration without deviating from the basic scope the invention disclosed herein. Further, in one embodiment, transmitter electrodes 360 may be configured as receiver electrodes and receiver electrodes 370 may be configured as transmitter electrodes.

Input Device Configurations

Figure 5A:
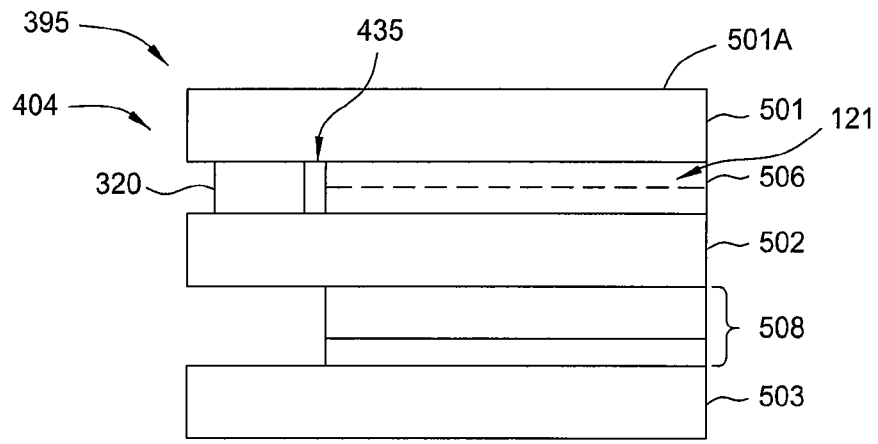
FIG. 5A is a partial side cross-sectional view of an input device used to sense an input object, according to one or more of the embodiments described herein.

FIG. 5A, illustrates an input device 395, comprising a first substrate 501 having a front surface and a rear surface on a side of the first substrate opposite to the front surface. In various embodiments first substrate 501 is substantially transparent. The input device 395 further comprises a second substrate 502 having a first surface. In various embodiments second substrate 502 is substantially transparent. The input device 395 further comprises a sensor controller 320 communicatively coupled to a plurality of sensor electrodes of senor electrode layer 506. In one embodiment, at least a portion of the sensor controller 320 and a portion of the plurality of sensor electrodes 506 are disposed in a volume 435 defined by a region of overlap between the rear surface of the first substrate 501 and the first surface of the second transparent substrate 503. In one embodiment, the sensor controller 320 and a portion of the sensor electrodes are disposed on the rear surface of the first substrate 501. In another embodiment, the sensor controller 320 and a portion of the sensor electrodes are disposed on the first surface transparent second substrate 502. In one embodiment, input device 395 comprises an integrated display device and sensor device 404. In this embodiment, the first substrate 501, which is similar to the first substrate 403 discussed above, is configured to cover and physically protect the components located below the first substrate 501. In one example, the first substrate 501 may be a lens that comprises a glass or plastic material. In some embodiments, the first transparent substrate is a polarizer located above the sensing elements (e.g., a hardened polarizer). The third substrate 503 may or may not be transparent, and may carry an active layer 508. The active layer 508 is configured to be electrically active, and may be driven to cause changes in the electric field that are used to form an image that can be viewed by a person positioned near the surface 501A of the first substrate 501. For example, the third substrate 503 may be a thin film transistor (TFT) substrate, and the active layer may be a TFT layer that comprises a plurality of field-effect transistors. A display IC such as the display controller 333, is communicatively coupled to the various electrical components disposed on the third substrate; and may in some cases be mounted to the third substrate 503, or located elsewhere and coupled through one or more connectors (also not shown). The third substrate may comprise materials such as glass, rigid plastic or flexible film (e.g., polyethylene terephthalate (PET) polyethylene naphthalate (PEN), polyimide, etc.).

The second substrate 502 is located between the first substrate 501 and the third substrate 503. Together, the second substrate 502 and the third substrate 503 sandwich an electric current-affected (or electric field-affected) display material, such as liquid crystal (LC), organic light emitting diode (OLED) material or some other display material affected by the electric field. In one embodiment, one or more sensor electrodes are located in a sensor electrode layer(s) 506 disposed between the first substrate 501 and second substrate 502, and may be at least partially disposed on either or both of the first substrate 501 and the second substrate 502. A sensor controller 320 configured for controlling these sensing elements 121 is also located at least partially in the volume 435 defined between the first and second transparent substrates, and may also be bonded to either or both of the first substrate 501 and second substrate 502. In general, the sensor electrode layer(s) 506 is similar to the sensor electrode layer(s) 406 discussed above. The sensor electrode layer(s) 506 may comprise one or more layers that contain an array of sensor electrodes, which are used to sense the positional information of the input object 140 by use of the sensor controller 320 that is disposed proximate to these sensor electrodes. In some examples, the sensor electrode layer(s) 506 may also include an anti-shatter film, polarizing layer and/or anti-reflective material. In one embodiment, sensor controller 320 may locally process the received sensor signals, and thus reduce the amount of information that needs to be output and size of the connector(s) or speed (e.g., clock rate for a serial interface) needed to deliver the information to the other components in the processing system. In many embodiments, locating the sensor controller 320 in the volume 435 defined between the first substrate 501 and second substrate 502, as described above, can also reduce the amount of EMI that may affect or couple into the output received from the sensing elements 121.

As a further example, some embodiments may lack some of the elements shown in FIG. 5A, and some embodiments may include other elements. For example, color filters may be disposed on a surface of the second substrate 502, such that the second substrate 502 may be termed a color filter substrate. As yet another example, in some configurations the portions of the sensor electrodes may disposed in different areas of the input device 395, such as being disposed on the surface of the second substrate 502 that is closer to the third substrate 503 or within the active layer 508 of the display device.

Figure 5B:
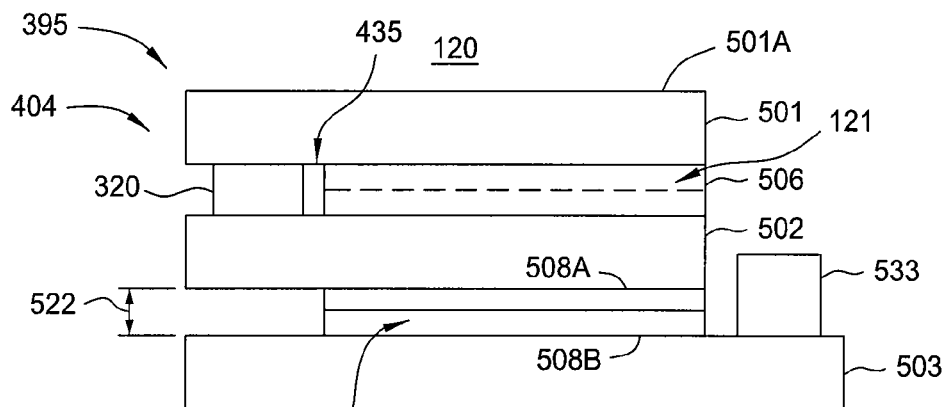
FIG. 5B is a partial side cross-sectional view of an input device used to sense an input object, according to one or more of the embodiments described herein.

FIG. 5B illustrates an example of a variation of the embodiment illustrated in FIG. 5A. Specifically, the sensor controller 320 and display controller 333 illustrated in FIG. 5B are both located and bonded to a portion of the sensor device 404. The sensor controller 320 is disposed at least partially in the volume 435 defined between the first and second transparent substrates 501, 502. The sensor controller 320 and display controller 333 are physically attached to portions of different substrates, such as the first or second transparent substrate 501, 502 and the third substrate 503. The sensor controller 320 may be bonded to the first or second transparent substrates 501, 502 and the display controller 333 may be bonded to the third substrate 503 using a COG or COF bonding techniques. The sensor controller 320 is electrically connected to at least a portion of the sensor electrodes disposed in the sensor electrode layer(s) 506 and display controller 333 is electrically connected to at least a portion of the active layer(s) 508A-B formed in the display device. In one embodiment the sensor controller 320 is coupled to at least a plurality of receiver electrodes and the display controller 333 is coupled to an active layer comprising a plurality of combination electrodes configured for both display updating and capacitive sensing.

In one embodiment, as shown in FIG. 5B, the second substrate 502 does not extend over the display controller 333, since the display controller 333 is taller than the space formed between the second substrate 502 and the third substrate 503. However, in some implementations, the second substrate 502 may extend over the display controller 333, and have one or more perforations, depressions, or both, to allow the display controller 333 to fit within the height 522 formed between the second substrate 502 and the third substrate 503.

In one example, as shown in FIG. 5B, the sensor controller 320 and display controller 333 are disposed on opposite sides of the sensing region 120. Positioning the display controller 333 on a side opposite to but near to the sensor controller 320 may offer some advantages in routing of the conductive routing traces, depending on the configuration of the rest of the system, and also enable a thinner overall stack up of the input device 395. However, in another example (see FIG. 7), the sensor controller 320 and display controller 333 may also be disposed on the same side of the sensing region 120.

Figure 5C:
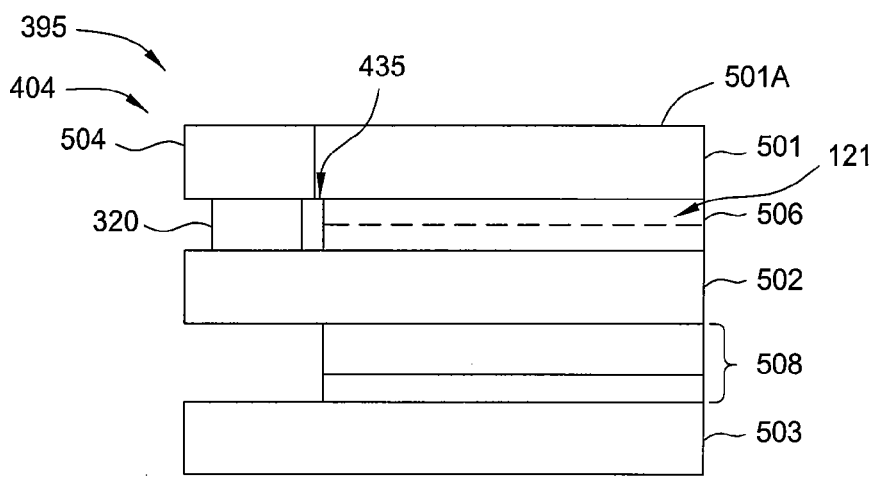
FIG. 5C is a partial side cross-sectional view of an input device used to sense an input object, according to one or more of the embodiments described herein.

FIG. 5C illustrates one configuration of the input device 395 that is shown in FIG. 5A, which utilizes a fourth substrate 504 that is located proximate to the first substrate 501. The fourth substrate 504 may or may not be transparent, but is used to cover the sensor controller 320 and its connection points. In some cases, the fourth substrate 504 may include a "hiding material" that is used to obscure the view of the sensor controller 320 through the surface 501A. The fourth substrate 504 may comprise part of a bezel, a housing, or component in the input device 395, such as a part of a mounting bracket used to attach the sensor device 404 to another portion of the input device 395. In this configuration, the sensor controller 320 is disposed at least partially in the volume 435 defined between the second substrate 502 and the fourth transparent substrate 504.

Figure 6A:
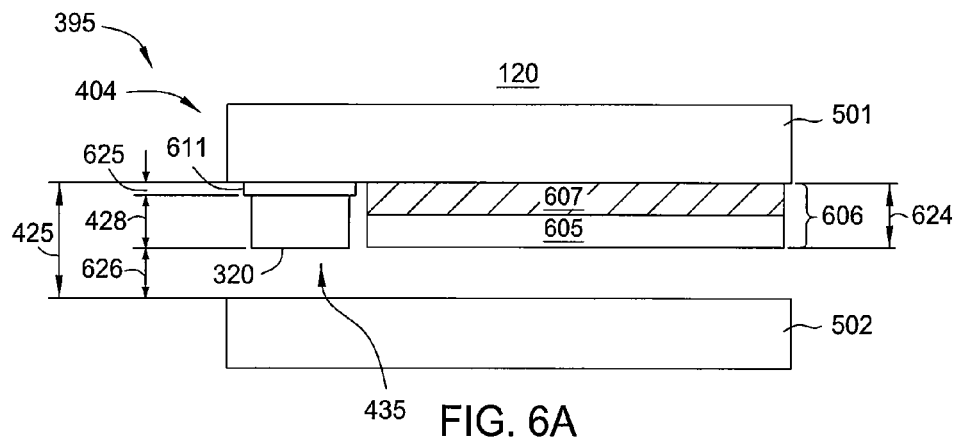
FIGS. 6A-6C are partial side cross-sectional views of an input device used to sense an input object, according to one or more of the embodiments described herein.
Figure 6B:
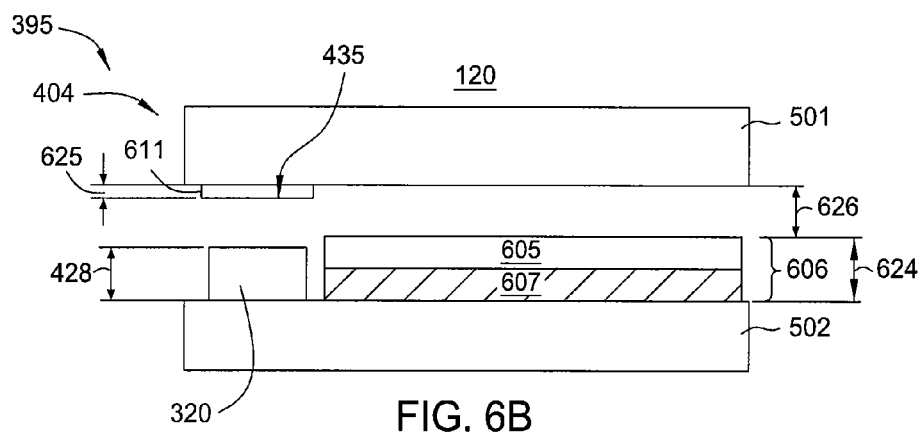

As yet further examples of variations of the input device 395, FIGS. 6A-6B illustrate two of many alternatives for mounting the sensor controller 320 and the sensing elements 121 shown in FIG. 5A. In FIG. 6A, both the sensor controller 320 and the sensing elements 121 are mounted to the first substrate 501. In the configurations illustrated in FIGS. 6A-6C, the sensor controller 320 is generally disposed at least partially in the volume 435 defined between the first substrate 501 and the second substrate 502. Specifically, a hiding material 611 (e.g., black matrix material, pigmented resin) is disposed between the first substrate 501 and the sensor controller 320. In one embodiment, the sensing sensor device 404 includes the first substrate 501, the second substrate 502 and sensor electrode layer 606 that contain at least a portion of the sensor electrodes, which is disposed therebetween. The sensor electrode layer 606, which is similar to sensor electrode layer(s) 506 discussed above, may comprise one or more layers that are used to aid in the collection of positional information of an input object over the sensing region 120, and/or a component that is used to improve the optical characteristics or safety aspects of the input device 395. In one configuration, the sensing elements 121 (not shown) are disposed within a first layer 607 of the sensor electrode layer 606, which is disposed on the first substrate 501. The first layer 607 may comprise a patterned single conductive layer, such as the sensor electrode layer 417 discussed above. An additional material layer 605 found in the sensor electrode layer 606, may include an optical clear adhesive (OCA) layer, a polarizer layer, anti-shatter layer and/or other similar material, which is disposed over the first layer 607.

In one embodiment of the input device 395, the thickness 624 of the sensor electrode layer 606 is greater than or equal to the formed thickness 428 of the sensor controller 320, or the thickness 428 of the sensor controller 320 plus the thickness 625 (e.g., 1-20 μm) of the hiding material 611. In one example, the first layer 607 is a sensor electrode layer 417 that is between about 1 and 10 μm thick, and the additional material layer 605 comprises a polarizing layer and/or anti-shatter film layer that is between about 100 and 250 μm thick. The stack up of the sensor controller 320, the hiding material 611, and whatever else is stacked with them, is generally made thinner than or as thin as, the distance 425 formed between the first substrate 501 and the second substrate 502. While the distance 425, illustrated in FIGS. 6A-6C, contains an air gap 626, this configuration is not intended to be limiting as to the scope of the invention disclosed herein, since the sensor device 404 may comprise a configuration where the sensor electrode layer 606 is in intimate contact with both the first substrate 501 and the second substrate 502, as illustrated in FIG. 5A. In various embodiments, the sensor electrode layer may be laminated to or bonded to the first substrate 501 and/or the second substrate 502.

In one embodiment, as illustrated in FIG. 6B, both the sensor controller 320 and the sensor electrode layer 606 are mounted on the second substrate 502. The hiding material 611 can be disposed on the first substrate 501, and the sensor controller 320 can be disposed on the second substrate 502. The first layer 607, which may comprise the sensor electrodes (not shown), is disposed on the second substrate 502, and the additional material layer 605 is disposed on the first layer 607. In general, the sensor electrodes (not shown) disposed in the first layer 607 are routed and electrically coupled to the sensor controller 320, as discussed above. As illustrated in FIG. 6B, in one embodiment, the thickness 624 of the sensor electrode layer 606 is greater than or equal to the formed thickness 428 of the sensor controller 320, or the formed thickness 428 of the sensor controller 320 plus the thickness 625 (e.g., 0.1-20 μm) of the hiding material 611. In another embodiment, the hiding material may be disposed on top the lens.

Figure 6C:
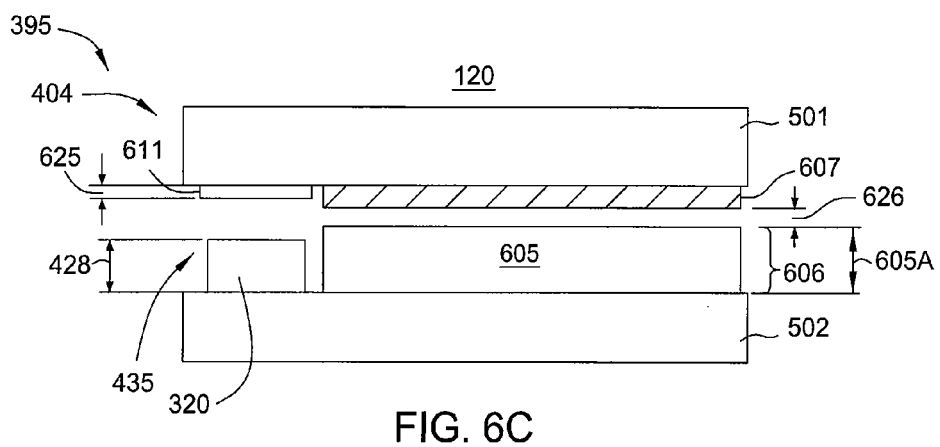

FIG. 6C illustrates a configuration of the sensor device 404 in which the first layer is disposed on the first substrate 501 and the additional material layer 605 and the sensor controller 320 are coupled to the second substrate 502. In one configuration, the hiding material 611 is also disposed on a surface of the first substrate 501 opposite to the sensor controller 320. In this case, the sensor controller 320 is electrically connected to the sensor electrodes formed in the first layer 607 by use of separate jumpers (not shown), wires (not shown) or other common interconnection techniques. As illustrated in FIG. 6C, in one embodiment, the thickness 605A of the additional material layer 605 is greater than or equal to the formed thickness 428 of the sensor controller 320.

Figure 7:
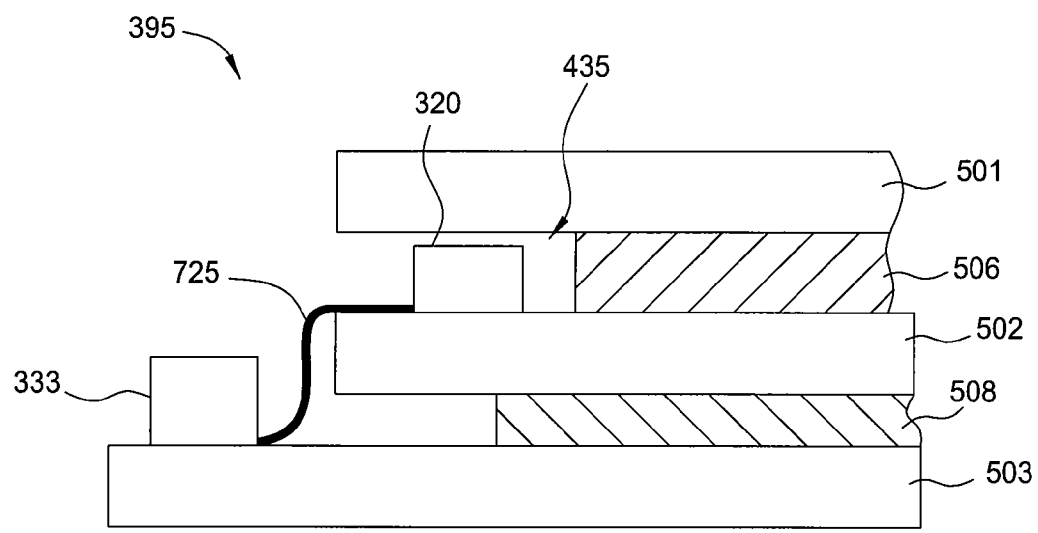
FIG. 7 is a partial side cross-sectional view of an input device used to sense an input object, according to one or more of the embodiments described herein.

In one embodiment of the input device 395, as illustrated in FIG. 7, the sensor controller 320 is communicatively coupled to the display controller 333 through a flexible circuit 725. In this configuration, the sensor controller 320 is disposed at least partially in the volume 435 defined between the first substrate 501 and the second substrate 502. As illustrated in FIG. 7, the sensor controller 320 and display controller 333 are physically attached to portions of different substrates, such as the second substrate 502 and the third substrate 503. The flexible circuit 725 is generally configured to electrically couple the sensor controller 320 and display controller 333, which are mounted on separate substrates, such as the second substrate 502 and the third substrate 503. In one configuration, the flexible circuit 725 is connected to conductive routing lines (e.g., sensor electrode layer 417) formed on the second and third substrates, and thus provides the various connections needed to connect the sensor controller 320 to display controller 333. In this configuration, the sensor controller 320 and the display controller 333 can be synchronized using a synchronizing mechanism 321A, as discussed above. Further, as is discussed herein, layers 508 and 506 may be used to sense an input object 140 in the sensing region 120 of the display device. Also, to prevent noise, electrical interference and/or electrical shorts, the sensing elements 121 in some cases may share a reference voltage with display controller 333, such as when capacitive sensors are used.

Figure 8A:
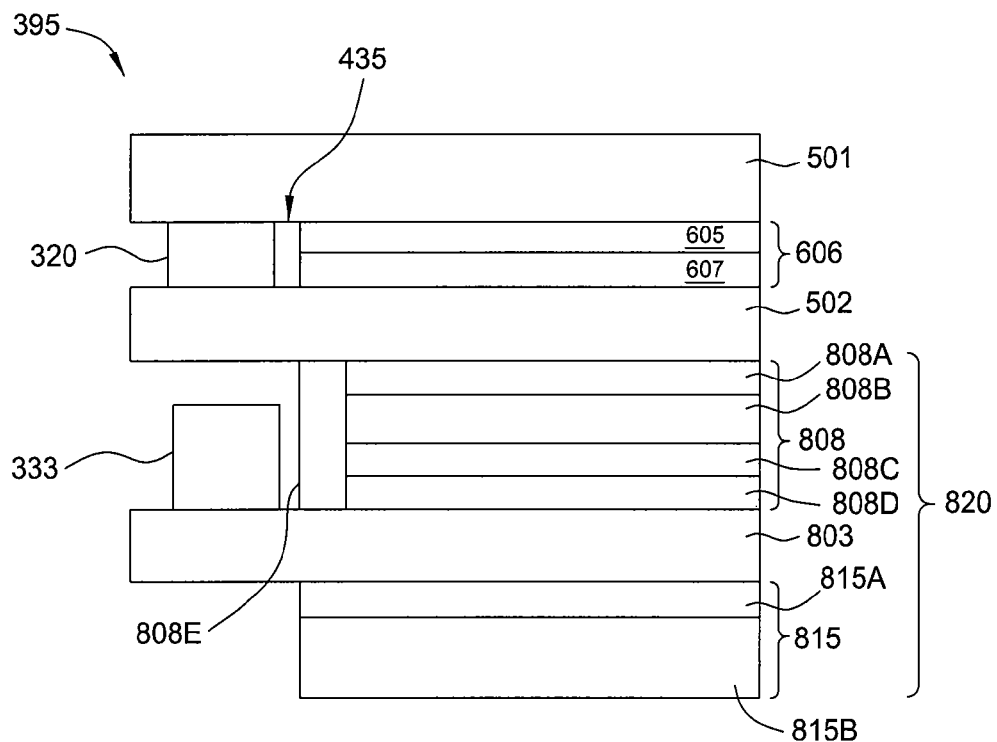
FIGS. 8A-8B are partial side cross-sectional views of an input device used in conjunction with an liquid crystal (LCD) display device, according to one or more of the embodiments described herein.
Figure 8B:
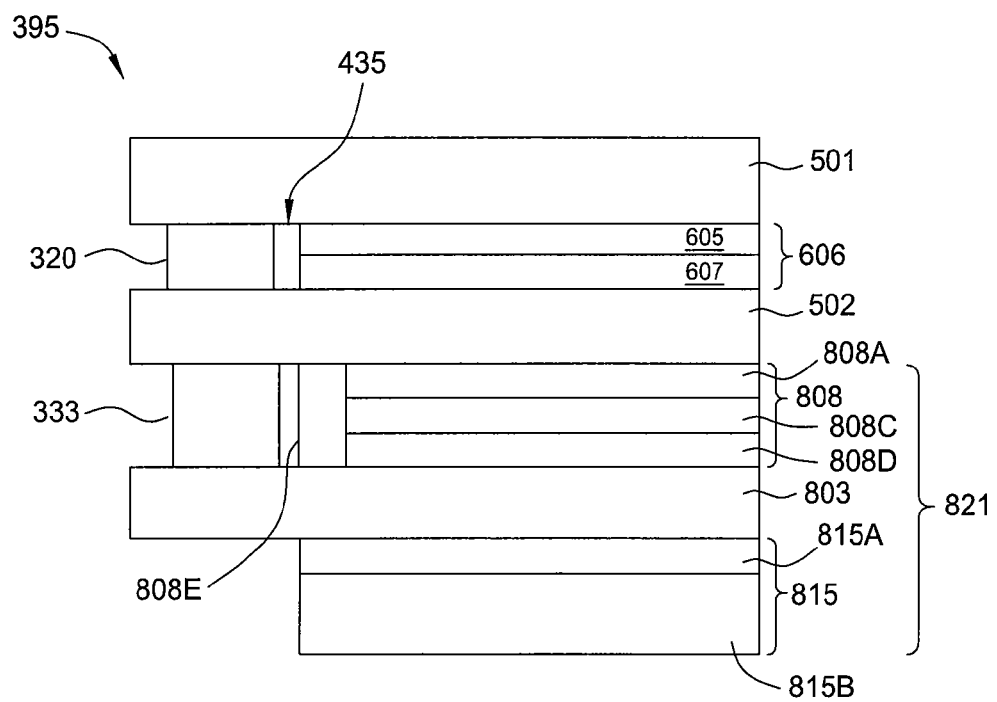

FIGS. 8A-8B illustrate two versions of the input device 395 that contains one or more components used to form at least part of an LCD display 820, 821 and some specific mounting alternatives for the sensor controller 320 and other components. In general, the input device 395, illustrated in FIG. 8A, may comprise the first substrate 501, the sensor electrode layer 606, the second substrate 502, LCD display elements 808, a third transparent substrate 803 and backlight module 815. The LCD display elements 808 may comprise a color filter layer 808A, a common electrode layer 808B, which contains the common electrodes 360, a liquid crystal containing layer 808C, a TFT layer 808D and gasket 808E, which is used to encapsulate the various layers found in the LCD display elements 808. In one embodiment, as shown in FIG. 8A, the first substrate 501 is a cover substrate, the second substrate 502 is a color filter substrate, the third substrate 803 is a TFT substrate, and the sensor controller 320 is mounted to a surface of the color filter substrate, which in some cases may be substrate 502, and the display controller 333 is mounted to a surface of the third substrate 803. In another embodiment, as shown in FIG. 8A, the first substrate 501 is a cover substrate, the second substrate 502 is a color filter substrate, the third substrate 803 is a TFT substrate, and the sensor controller 320 is mounted to a surface of the first transparent substrate (the cover substrate) and the display controller 533 is mounted to a surface of the third substrate 803. In one configuration, the additional material layer 605 formed in the sensor electrode layer 606 comprises a polarizing layer. The backlight module 815 may comprised a polarizing layer 815A and a backlight device 815B, which delivers light to the LCD display elements 808.

Therefore, in the configuration illustrated in FIG. 8A, the sensor controller 320, which is disposed in the volume 435 formed between the first substrate 501 and the second substrate 502, is configured to communicate with the receiver electrodes (not shown), such as receiver electrodes 370 (FIG. 3A), disposed in the first layer 607 and the display controller 333 is configured to drive the common electrodes (not shown), such as the common electrodes 360 (FIG. 3A), disposed in the common electrode layer 808B. The common electrode(s) disposed in the common electrode layer 808B can be combination electrodes that are also configured to deliver signals to the receiver electrodes disposed in the first layer 607 during sensor operation. In one example, one or more sensor electrode(s) are disposed on the top of the color filter substrate, and these sensing elements may be configured as transmitter and/or receiver electrode(s).

FIG. 8B illustrates an alternate version of the input device 395 that contains one or more components used to form a second type of LCD display 821, which is commonly known as an in-plane switching (IPS), fringe field switching (FFS) or plane line switching (PLS) LCD technology device. In this configuration, the sensor controller 320 is disposed at least partially in the volume 435 defined between the first substrate 501 and the second substrate 502. As illustrated in FIG. 8B, an IPS LCD display 821 generally does not contain a common electrode layer 808B that is separate from the TFT layer 808D. Therefore, the LCD display 821 differs from the configuration of the LCD display 820 shown in FIG. 8A, since it does not contain a separate a common electrode layer 808B, and thus the display controller 533 will primarily communicate with the common electrodes formed in the TFT layer 808D, and the sensor controller 320 is connected to the sensor electrodes disposed in the first layer 607. In various embodiments, one or more sensor electrodes (may or may not comprise a substantially opaque material) may be patterned and or rotationally aligned on the color filter glass in order to reduce the visual effect of the patterned sensor electrodes on the luminance of the display device (e.g., the subpixels).

Figure 9A:
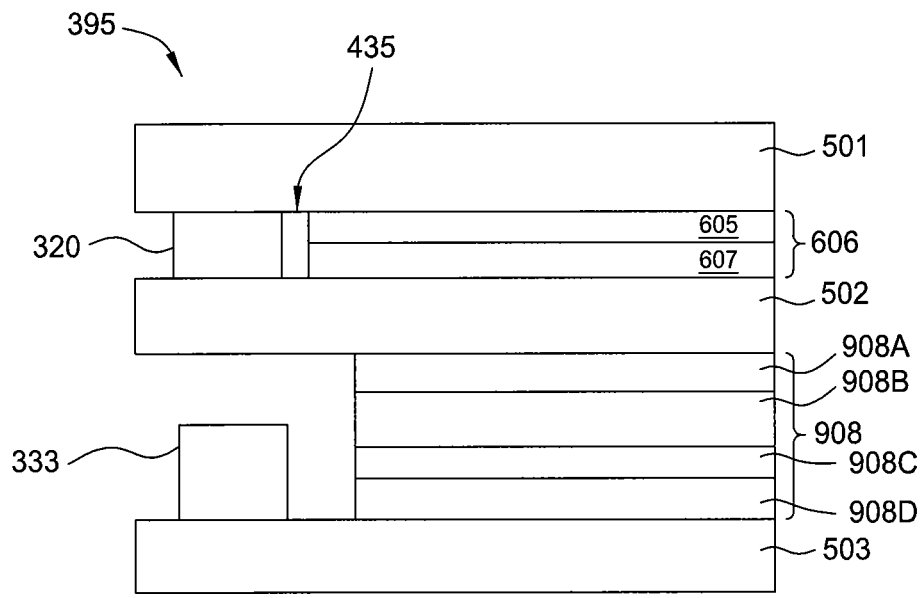
FIGS. 9A-9B are partial side cross-sectional views of an input device used in conjunction with an organic light emitting diode (OLED) display device, according to one or more of the embodiments described herein.
Figure 9B:
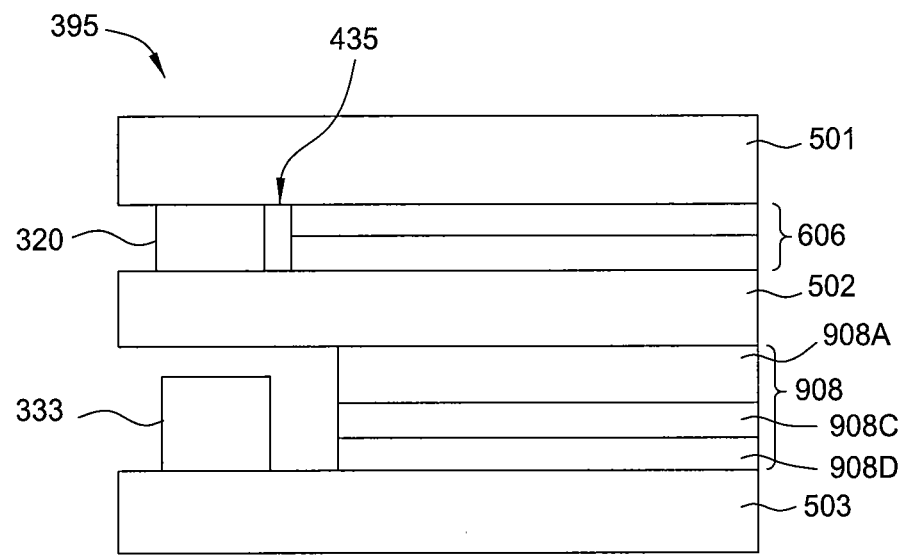

FIGS. 9A-9B illustrate two versions of the input device 395 that contains one or more components used to form at least part of an organic light emitting diode (OLED) display 908 and some specific mounting alternatives for the sensor controller 320 and other components. In general, the input device 395, illustrated in FIG. 9A, may comprise the first substrate 501, the sensor electrode layer 606, the second substrate 502, an OLED display elements 908, and a third transparent substrate 503. In this configuration, the sensor controller 320 is disposed at least partially in the volume 435 defined between the first substrate 501 and the second substrate 502. In one example, the first substrate 501 is a cover substrate, the second substrate 502 is a sealing substrate, and the third substrate 503 is a TFT substrate. The OLED display elements 908 may comprise a color filter layer 908A, a common electrode layer 908B, which contains common electrodes 360, an organic light emitting diode material layer 908C, and a TFT layer 908D. In one example, the sensor controller 320 is mounted on the sealing substrate, and the display controller 333 is mounted on the third substrate 503 (e.g., TFT substrate). In another example, the sensor controller 320 is mounted on the cover substrate, and the display controller 333 is mounted on the third substrate 503 (e.g., TFT substrate). The additional material layer 605 may comprise a polarizer layer that is disposed between the second substrate 502 and second substrate 502, for optical reasons, and may also include a color filter or a laminating or adhesive layer(s). In this configuration, one or more common electrode(s) may be located between the second substrate 502 and third substrate 503 and used in conjunction with the TFT layer 908D to control the light emission from the organic LED material. The common electrode(s) may also be combination electrode(s) that can be configured for sensing input. For example, the common electrode(s) may also be configured as transmitter electrode(s) 360. One or more sensor electrode(s) are disposed on the top of the second substrate 502, and these sensor electrode(s) may be configured as transmitter and/or receiver electrode(s). The embodiment of the input device 395 illustrated in FIG. 9B is similar to FIG. 9A, except that the color filter layer 908A is not present within the OLED display elements 908, but may replace or be added to a polarizer layer disposed in the additional material layer 605. Alternately, in one embodiment, a color filter layer maybe present in an OLED panel.

As noted discussed above, many embodiments of the input device 100, which include integrated touch screens, have been described. Some embodiments comprise a first transparent substrate, a second transparent substrate, and a third substrate. The first transparent substrate may be configured to be located closer to users' eyes during use, and in some cases may be a lens, or sometime referred to as the window glass. The third substrate may carry an active layer configured to change the electric field. The third substrate may be a TFT substrate and the active layer may be a TFT layer. A display controller may be communicatively coupled to the third substrate, mounted to the third substrate and/or located remotely from the third substrate. The second transparent substrate is located between the first transparent substrate and the third substrate. Together, the second transparent substrate and the third substrate sandwich an electric field-affected display material (such as liquid crystal (LC), organic light emitting diode (OLED) material, or some other display material affected by the electric field). At least a portion of a plurality of sensing elements 121 are located at least partially in a volume 435 defined between the first and second transparent substrates, and may be disposed on either or both of the first and second transparent substrates. A sensor controller 320 configured for controlling these sensing elements 121 is located between the first and second transparent substrates, or between the first transparent substrate and a fourth substrate (FIG. 5C), and may be disposed on the first transparent substrate or the second transparent substrates (or to the fourth substrate). The sensor controller 320 may be configured to fit within the volume 435 formed between the first and second transparent substrates. In another configuration, the sensor controller 320 may be configured to fit entirely within the volume 435 formed between the first and second transparent substrates. For example, the sensor controller 320 may be targeted to be at least as thin as the stack-up of other materials that are located between the first and second transparent substrates.

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present invention, other and further embodiments of the invention may be devised without departing from the basic scope thereof, and the scope thereof is determined by the claims that follow.

The invention claimed is:

1. An input device, comprising:
a first substrate having a front surface and a rear surface, wherein the rear surface is on a side of the first substrate opposite to the front surface;
a second substrate having a first surface;
a plurality of sensor electrodes; and
a sensor controller communicatively coupled to the plurality of sensor electrodes, wherein at least a substantial portion of the sensor controller and a portion of the plurality of sensor electrodes are disposed in a volume defined by a region of overlap between the rear surface of the first substrate and the first surface of the second substrate, and wherein the sensor controller is configured to receive resulting signals from the portion of the plurality of sensor electrodes and to transmit a processed signal to a first controller.

2. The input device of claim 1, wherein the first substrate and the second substrate are substantially transparent.

3. The input device of claim 1, wherein the front surface is a viewing surface of a display device.

4. The input device of claim 1, wherein the plurality of sensor electrodes are disposed on at least one of the first substrate and the second substrate.

5. The input device of claim 1, further comprising a sensor electrode layer that essentially comprises one or more components selected from a group consisting of an anti-shatter film layer, an antistatic film layer, a polarizer film layer and an electrode layer, wherein the electrode layer comprises the plurality of sensor electrodes that comprise a plurality of transmitter electrodes or a plurality of receiver electrodes.

6. The input device of claim 1, further comprising a plurality of conductive routing traces disposed on only one of the first substrate and the second substrate, wherein the conductive routing traces are coupled to the sensor controller and to the plurality of sensor electrodes.

7. The input device of claim 1, further comprising a sensor electrode layer that comprises one or more electrode layers that contain the plurality of sensor electrodes that essentially comprise a plurality of receiver electrodes and a plurality of routing traces, wherein each routing trace is configured to connect a receiver electrode to the sensor controller.

8. The input device of claim 1, wherein the second substrate further comprises a second surface that is on a side of the second substrate that is opposite to the first surface, and the input device further comprises an active layer of a display device disposed on a third substrate, wherein the third substrate is coupled to the second surface of the second substrate.

9. The input device of claim 8, wherein the third substrate comprises a thin-film transistor (TFT) substrate, and the active layer is a thin-film transistor (TFT) layer that comprises a plurality of transistors.

10. The input device of claim 1, wherein the plurality of sensor electrodes comprise a plurality of common electrodes, and wherein at least one of the plurality of common electrodes is configured for both capacitive sensing and updating a display of a display device, and wherein the portion of the plurality of sensor electrodes disposed in the volume comprise a plurality of receiver electrodes that are configured to receive resulting signals from at least one of the plurality of common electrodes.

11. The input device of claim 1, further comprising:
a first layer disposed between the rear surface of the first substrate and the first surface of the second substrate, wherein the first layer has a first thickness, and comprises a polarizing layer or an anti-shatter film layer, and
wherein the sensor controller has a first surface, a second surface and a sensor controller thickness defined between the first surface of the sensor controller and the second surface of the sensor controller, and the sensor controller thickness is less than or equal to the first thickness.

12. The input device of claim 1, wherein the plurality of sensor electrodes are configured to sense an input object within a sensing region over the first surface of the first substrate, and
wherein the volume defined by a region of overlap between the rear surface of the first substrate and the first surface of the second substrate is further defined by the region of overlap disposed between an edge of the sensing region and an edge of the first or second substrate.

13. The input device of claim 1, wherein the sensor controller has a first surface, a second surface, a sensor controller thickness defined between the first surface and the second surface, a width and a length, wherein the width and the length are each measured in a direction that is parallel to the first surface and are not equal in magnitude.

14. The input device of claim 1, wherein the sensor controller is contained within the volume defined by the region of overlap between the rear surface of the first substrate and the first surface of the second substrate.

15. The input device of claim 1, further comprising:
a plurality of routing traces, wherein each routing trace is configured to connect a sensor electrode to the sensor controller; and
a plurality of communication lines that are configured to connect the sensor controller to the first controller, wherein the number of communication lines is less than the number of routing traces.

16. The input device of claim 1, wherein the plurality of sensor electrodes are disposed within a sensor electrode layer, wherein the sensor electrode layer is in contact with the rear surface of the first substrate and the first surface of the second substrate.

17. The input device of claim 1, wherein
the plurality of sensor electrodes are disposed within a sensor electrode layer that has a first thickness, and
the sensor controller has a second thickness, wherein the second thickness is less than or equal to the first thickness.

18. The input device of claim 17, wherein the sensor electrode layer further comprises one or more components selected from a group consisting of an anti-shatter film layer, an antistatic film layer and a polarizer film layer.

19. A touch screen, comprising:
a first transparent substrate having a front surface and a rear surface, wherein the rear surface is on a side of the first transparent substrate opposite to the front surface;
a second transparent substrate having a first surface and a second surface, wherein the second surface is on a side of the second transparent substrate opposite to the first surface;
a third substrate having a first surface over which at least a portion of a display device is disposed, wherein the second transparent substrate is disposed between the rear surface of the first transparent substrate and the first surface of the third substrate;
a plurality of sensor electrodes; and
a sensor controller communicatively coupled to the plurality of sensor electrodes, wherein at least a substantial portion of the sensor controller and at least a portion of the plurality of sensor electrodes are disposed in a volume defined between the rear surface of the first transparent substrate and the first surface of the second transparent substrate, and wherein the sensor controller is configured to receive resulting signals from the at least a portion of the plurality of sensor electrodes and to transmit a processed signal to a first controller.

20. The touch screen of claim 19, wherein the at least a portion of the display device further comprises a display controller that is coupled to the third substrate, and wherein the first transparent substrate is a lens that has a viewing surface.

21. The touch screen of claim 19, wherein the plurality of sensor electrodes are disposed on at least one of the first transparent substrate and the second transparent substrate, and wherein the plurality of sensor electrodes comprise at least one of a plurality of transmitter electrodes and receiver electrodes.

22. The touch screen of claim 19, wherein the display device comprises a thin-film transistor (TFT) layer that comprises a plurality of transistors.

23. The touch screen of claim 19, wherein the plurality of sensor electrodes comprise a plurality of common electrodes, and wherein at least one of the plurality of common electrodes is configured for both capacitive sensing and updating a display of the display device, and wherein the plurality of sensor electrodes further comprises a plurality of receiver electrodes that are configured to receive resulting signals from at least one of the plurality of common electrodes.

24. The touch screen of claim 19, wherein the plurality of sensor electrodes are configured to sense a position of an input object disposed over a sensing region formed over the first surface of the first transparent substrate, and
  wherein the volume defined between the rear surface of the first transparent substrate and the first surface of the second transparent substrate is further defined by a region disposed between an edge of the sensing region and an edge of the first or second transparent substrate.

25. The touch screen of claim 19, further comprising:
  a plurality of routing traces, wherein each routing trace is configured to connect a sensor electrode to the sensor controller; and
  a plurality of communication lines that are configured to connect the sensor controller to the first controller, wherein the number of communication lines is less than the number of routing traces.

26. A method of forming an input device, comprising:
  coupling a first surface of a first transparent substrate to a first surface of a second substrate, wherein a plurality of sensor electrodes are disposed between the first surface of the first transparent substrate and the first surface of the second substrate; and
  coupling a sensor controller that is electrically coupled to the plurality of sensor electrodes to either the first surface of the first transparent substrate or the first surface of the second substrate so that the sensor controller is at least substantially disposed in a volume defined between the first surface of the first transparent substrate and the first surface of the second substrate, wherein the sensor controller is configured to receive resulting signals from the plurality of sensor electrodes and to transmit a processed signal to a first controller.

27. The method of claim 26, wherein the plurality of sensor electrodes comprises a plurality of common electrodes, wherein at least one of the plurality of common electrodes is configured for capacitive sensing and updating a display of a display device, and wherein the plurality of sensor electrodes further comprises a plurality of receiver electrodes that are configured to receive resulting signals from at least one of the plurality of common electrodes.

28. The method of claim 26, wherein the plurality of sensor electrodes comprises at least one of a plurality of receiver electrodes and a plurality of transmitter electrodes.

* * * * *